United States Patent
Hubner et al.

(10) Patent No.: US 12,471,518 B2
(45) Date of Patent: Nov. 18, 2025

(54) SYSTEMS AND METHODS FOR SELECTIVE MATERIAL PLACEMENT, SENSING, AND CONTROL

(71) Applicant: Deere & Company, Moline, IL (US)

(72) Inventors: Cary S. Hubner, Geneseo, IL (US); Grant J. Wonderlich, Milan, IL (US)

(73) Assignee: DEERE & COMPANY, Moline, IL (US)

( * ) Notice: Subject to any disclaimer, the term of this patent is extended or adjusted under 35 U.S.C. 154(b) by 1069 days.

(21) Appl. No.: 17/167,784

(22) Filed: Feb. 4, 2021

(65) Prior Publication Data
US 2022/0240441 A1    Aug. 4, 2022

(51) Int. Cl.
| | |
|---|---|
| A01C 7/10 | (2006.01) |
| A01C 7/04 | (2006.01) |
| A01C 7/16 | (2006.01) |
| G01F 1/36 | (2006.01) |
| G01J 5/00 | (2022.01) |
| G01J 5/10 | (2006.01) |
| G01N 21/25 | (2006.01) |
| G01N 27/04 | (2006.01) |
| G01N 27/22 | (2006.01) |
| G01V 8/12 | (2006.01) |
| G05B 15/02 | (2006.01) |

(52) U.S. Cl.
CPC ........... *A01C 7/105* (2013.01); *G01F 1/36* (2013.01); *G01J 5/00* (2013.01); *G01J 5/10* (2013.01); *G01N 21/25* (2013.01); *G01N 27/041* (2013.01); *G01N 27/043* (2013.01); *G01N 27/22* (2013.01); *G01V 8/12* (2013.01); *G05B 15/02* (2013.01); *A01C 7/0443* (2023.05); *A01C 7/0445* (2023.05); *A01C 7/046* (2013.01); *A01C 7/16* (2013.01)

(58) Field of Classification Search
CPC ........... A01C 7/105; A01C 7/046; A01C 7/16; G01F 1/36; G01J 5/00; G01J 5/10; G01N 21/25; G01N 27/041; G01N 27/043; G01N 27/22; G01V 8/12; G05B 15/02
See application file for complete search history.

(56) References Cited

U.S. PATENT DOCUMENTS

| 4,141,390 A | * | 2/1979 | Arnold | .............. | A01G 9/085 47/1.01 R |
|---|---|---|---|---|---|
| 2013/0124055 A1 | | 5/2013 | Baurer et al. | | |
| 2013/0144827 A1 | | 6/2013 | Trevino | | |

(Continued)

FOREIGN PATENT DOCUMENTS

WO    WO2016205424 A1    12/2016

OTHER PUBLICATIONS

Ehsani, M. R., S. K. Upadhyaya, and M. L. Mattson. "Seed location mapping using RTK GPS." Transactions of the ASAE 47.3 (2004): 909-914. (Year: 2004).*

(Continued)

*Primary Examiner* — Robert J Eom
(74) *Attorney, Agent, or Firm* — Christopher J. Volkmann; KELLY, HOLT & CHRISTENSON PLLC

(57) ABSTRACT

Locations of seeds in a field can be identified. A material is applied to the field by an agricultural machine, based upon the seed locations. The placement of the material is detected and the agricultural machine is controlled.

21 Claims, 14 Drawing Sheets

(56) References Cited

U.S. PATENT DOCUMENTS

| | | | |
|---|---|---|---|
| 2015/0025752 A1* | 1/2015 | Tolstedt | G05D 1/0278 |
| | | | 701/50 |
| 2018/0359909 A1 | 12/2018 | Conrad et al. | |
| 2019/0116725 A1 | 4/2019 | Hanya et al. | |
| 2019/0350127 A1 | 11/2019 | Sauder et al. | |
| 2020/0253107 A1 | 8/2020 | Madison et al. | |
| 2024/0016079 A1 | 1/2024 | Dreyer et al. | |

OTHER PUBLICATIONS

Chandel, N. S., et al. "Digital map-based site-specific granular fertilizer application system." Current science (2016): 1208-1213. (Year: 2016).*

U.S. Appl. No. 17/167,784 Application and Drawings, filed Feb. 4, 2021, 55 pages.

Extended European Search Report and Written Opinion issued in European Patent Application No. 22153415.9, dated Jun. 27, 2022, in 08 pages.

* cited by examiner

SYSTEMS AND METHODS FOR SELECTIVE MATERIAL PLACEMENT, SENSING, AND CONTROL

FIELD OF THE DESCRIPTION

The present description relates to agricultural machines. More specifically, the present description relates to identifying application of material to a field, using an agricultural machine, and controlling the agricultural machine.

BACKGROUND

There is a wide variety of different types of agricultural machines that apply material to an agricultural field. Some such agricultural machines include sprayers, tillage machines with side dressing bars, air seeders, chemical application machines, and planters that have row units.

As one example, a row unit is often mounted to a planter with a plurality of other row units. The planter is often towed by a tractor over soil where seed is planted in the soil, using the row units. The row units on the planter follow the ground profile by using a combination of a down force assembly that imparts a down force to the row unit to push disk openers into the ground and gauge wheels to set depth of penetration of the disk openers.

Row units can also be used to apply material (e.g., pesticides, herbicides, or fertilizer) to the field (e.g., to the soil, to a seed, etc.) over which they are traveling. In some scenarios, each row unit has a valve that is coupled between a source of material to be applied, and an application assembly. As the valve is actuated, the material passes through the valve, from the source to the application assembly, and is applied to the field.

Many current systems apply the material in a substantially continuous way. For instance, where the application machine is applying a liquid fertilizer, it actuates the valve to apply a substantially continuous strip of the liquid fertilizer. The same is true of materials that provide other liquid substances, or granular substances, as examples.

The discussion above is merely provided for general background information and is not intended to be used as an aid in determining the scope of the claimed subject matter.

SUMMARY

Locations of seeds in a field can be identified. A material is applied to the field by an agricultural machine, based upon the seed locations. The placement of the material is detected and the agricultural machine is controlled.

Example 1 is an agricultural system, comprising:
a reference position identifier configured to identify a reference position on an agricultural surface;
a material application system configured to apply material based on the identified reference position;
a material sensor configured to sense a characteristic of the material and generate a material sensor signal indicative of the characteristic;
a sensor signal processing system configured to identify a location of the applied material based on the material sensor signal and generate a processing system output signal based on the location of the applied material and based on the reference position;
an action identification system configured to identify an action based on the processing system output signal; and
a control signal generation system configured to generate a control signal to perform the identified action.

Example 2 is the agricultural system of any or all previous examples wherein the material application system comprises an actuator that is actuated to apply the material and wherein the material sensor comprises:
a pressure sensor configured to sense a pressure of material applied by the valve and generate, as the material sensor signal, a pressure sensor signal indicative of the pressure of the material and indicative of application of the material.

Example 3 is the agricultural system of any or all previous examples wherein the material application system comprises an actuator that is actuated to apply the material and wherein the material sensor comprises:
a flow sensor configured to sense flow of material through the material application system and generate, as the material sensor signal, a flow sensor signal indicative of the flow of the material.

Example 4 is the agricultural system of any or all previous examples wherein the material sensor comprises:
an optical sensor configured to sense, as the characteristic of the material, an optical characteristic of the material applied by the material application system and generate, as the material sensor signal, an optical sensor signal indicative of the optical characteristic of the material.

Example 5 is the agricultural system of any or all previous examples wherein the optical sensor is configured to detect a material additive in the applied material.

Example 6 is the agricultural system of any or all previous examples wherein the optical sensor comprises:
a beam break sensor that has a radiation emitter configured to emit electromagnetic radiation and a radiation detector configured to detect electromagnetic radiation and is configured to sense, as the characteristic of the material, that the material breaks a radiation beam emitted by the radiation emitter and generate, as the material sensor signal, a beam break sensor signal indicative of the material breaking the radiation beam.

Example 7 is the agricultural system of any or all previous examples wherein the optical sensor comprises:
a light curtain sensor that has a light curtain radiation emitter configured to emit a light curtain of electromagnetic radiation and a radiation detector configured to detect electromagnetic radiation and is configured to sense, as the characteristic of the material, that the material breaks the light curtain of electromagnetic radiation and generate, as the material sensor signal, a light curtain break sensor signal indicative of the material breaking the light curtain of electromagnetic radiation.

Example 8 is the agricultural system of any or all previous examples wherein the optical sensor comprises:
an image sensor configured to sense, as the characteristic of the material, an image of the agricultural surface where the material is applied by the material application system and generate, as the material sensor signal, an image signal indicative of the image of the agricultural surface.

Example 9 is the agricultural system of any or all previous examples wherein the material sensor comprises:
a temperature sensor configured to sense, as the characteristic of the material, a temperature characteristic of the material applied by the material application system and generate, as the material sensor signal, a temperature sensor signal indicative of the temperature characteristic of the material.

Example 10 is the agricultural system of any or all previous examples wherein the temperature sensor comprises an infrared (IR) sensor.

Example 11 is the agricultural system of any or all previous examples wherein the material sensor comprises:

an electrical property sensor configured to sense, as the characteristic of the material, an electrical property of the material applied by the material application system and generate, as the material sensor signal, an electrical property sensor signal indicative of the electrical property of the material.

Example 12 is the agricultural system of any or all previous examples wherein the electrical property sensor comprises:

an electrical conductivity sensor configured to sense, as the characteristic of the material, an electrical conductivity of the material applied by the material application system and generate, as the material sensor signal, an electrical conductivity sensor signal indicative of the electrical conductivity of the material.

Example 13 is the agricultural system of any or all previous examples wherein the electrical property sensor comprises:

an electrical capacitance sensor configured to sense, as the characteristic of the material, an electrical capacitance of the material applied by the material application system and generate, as the material sensor signal, an electrical capacitance sensor signal indicative of the electrical capacitance of the material.

Example 14 is the agricultural system of any or all previous examples wherein the material sensor comprises:

a spectroscopy sensor configured to sense, as the characteristic of the material, a spectroscopic property of the material applied by the material application system and generate, as the material sensor signal, a spectroscopic property sensor signal indicative of the spectroscopic property of the material.

Example 15 is the agricultural system of any or all previous examples and further comprising a seed delivery system and a seed metering system wherein the reference position identifier comprises:

a seed sensor configured to sense a seed in one of the seed delivery system and the seed metering system and generate a seed sensor signal indicative of the sensed seed; and a seed location identifier configured to identify, as the reference position, a seed location of seed on the agricultural surface based on the seed sensor signal.

Example 16 is an agricultural planting machine, comprising:

a reference position identifier configured to identify a reference position on an agricultural surface;

a material application system configured to apply material based on the identified reference position;

a material sensor configured to sense a characteristic of the material and generate a material sensor signal indicative of the characteristic;

a sensor signal processing system configured to identify a location of the applied material based on the material sensor signal and generate processing system output signal based on the location of the applied material and based on the reference position;

an action identification system configured to identify an action based on the processing system output signal; and a control signal generation system configured to generate a control signal to perform the identified action.

Example 17 is the agricultural planting machine of any or all previous examples wherein the material sensor comprises:

an optical sensor configured to sense, as the characteristic of the material, an optical characteristic of the material applied by the material application system and generate, as the material sensor signal, an optical sensor signal indicative of the optical characteristic of the material.

Example 18 is the agricultural planting machine of any or all previous examples wherein the material sensor comprises:

a temperature sensor configured to sense, as the characteristic of the material, a temperature characteristic of the material applied by the material application system and generate, as the material sensor signal, a temperature sensor signal indicative of the temperature characteristic of the material.

Example 19 is the agricultural planting machine of any or all previous examples wherein the material sensor comprises:

an electrical property sensor configured to sense, as the characteristic of the material, an electrical property of the material applied by the material application system and generate, as the material sensor signal, an electrical property sensor signal indicative of the electrical property of the material.

Example 20 is a method of controlling an agricultural system, comprising:

identifying a reference position on an agricultural surface;

applying material to the agricultural surface based on the identified reference position;

sensing a characteristic of the material;

generating a material sensor signal indicative of the characteristic;

identifying a location of the applied material based on the material sensor signal;

generating a processing system output signal based on the location of the applied material and based on the reference position;

identifying an action based on the processing system output signal; and generating a control signal to perform the identified action.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, many current systems apply material to a field in a relatively continuous way. This can result in wasted material. For instance, some material that is applied at certain locations between seeds or plants in a field may be unnecessary. This can result in lower productivity and lower efficiency. This problem can be exacerbated in instances where the material is applied at a relatively high rate, such as in the case of high rate fertilizer application.

The present description thus proceeds with respect to a system that identifies a reference location, e.g., a seed location, and controllably dispenses or applies material, based upon the reference location (and/or position) in a field. The present description also proceeds with respect to a system that detects a location where the material was applied. The system can then generate an action signal, such as a control signal, based on the location where the material was applied.

The system can identify the reference location by sensing seeds, as they are planted in the soil, and then calculating a time when an application valve or actuator, e.g., a pump, should be actuated to apply the material, based upon the location of the valve or actuator relative to the location of the seed. Similarly, an a prior seed map can be obtained indicating where seeds will be planted (e.g., seed locations) and the system controllably dispenses or applies material based on those a priori locations. The seeds can then be planted later. Further, the system can be used to apply the material and generate a material map of the locations where it was applied. A seed map can be generated based on the material map, and seeds can be planted based on that seed map. Other things can be considered as well, such as the responsiveness of the valve or actuator, the material properties of the material being applied, etc.

The present system can detect the location where the material was applied, such as the location of the material relative to the reference location or the location where the material was applied in a global or local coordinate system. The location where the material was applied can then be used to generate an action signal, such as a control system.

Also, the present description proceeds with respect to the examples being deployed on a row unit of a planter. They could just as easily be deployed on a sprayer, an air seeder, a tillage machine with a side-dress bar, or other piece of agricultural equipment that is used to apply a material.

Figure 1:
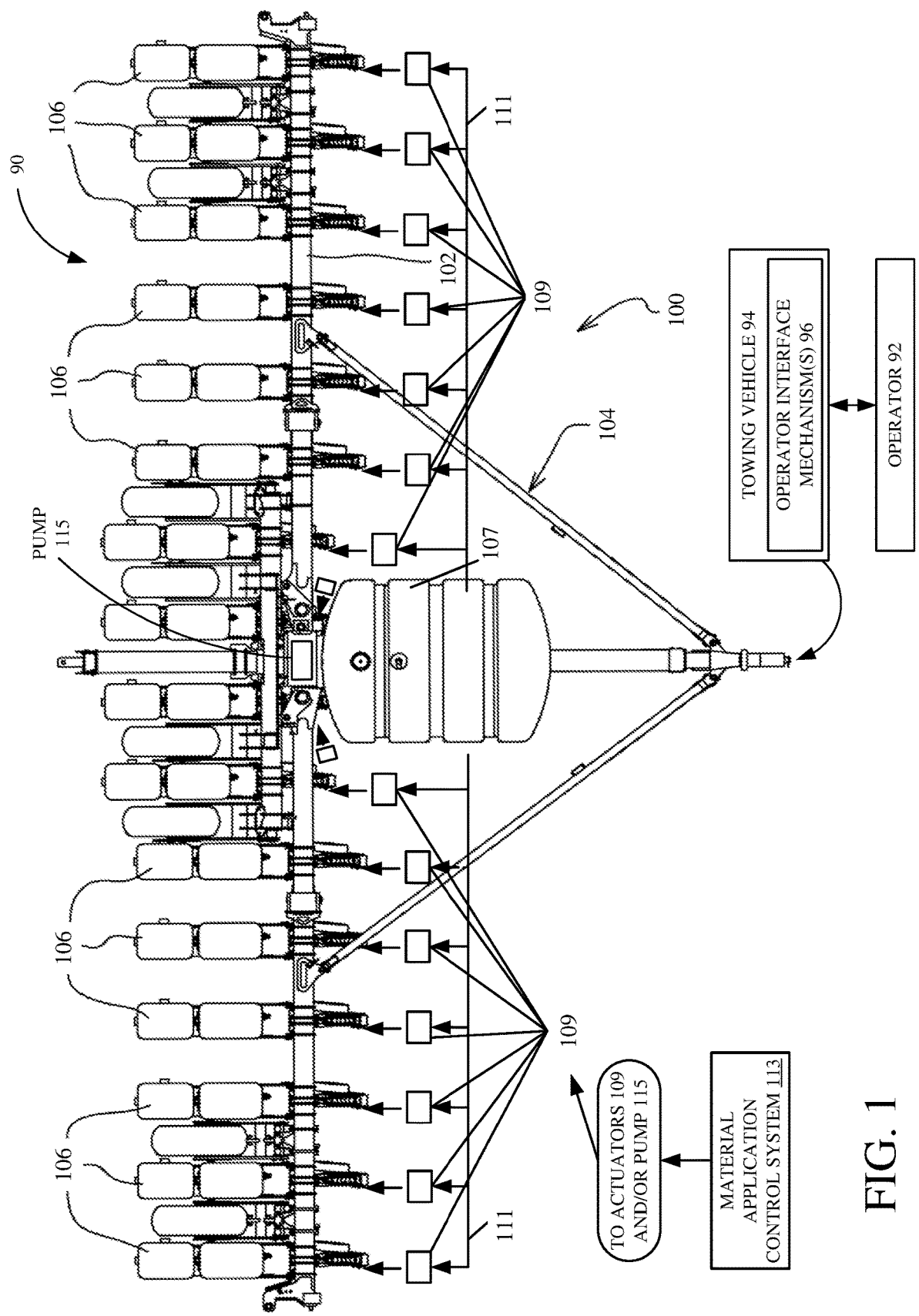
FIG. 1 is a top view of one example of an agricultural system with a planting machine, shown in a partial pictorial and partial schematic form.

FIG. 1 is a partial pictorial, partial schematic top view of one example of an architectural system 90 that includes agricultural planting machine 100, towing vehicle 94, that is operated by operator 92, and material application control system 113, which can be on one or more individual parts of machine 100, centrally located on machine 100, on towing vehicle 94, or disbursed on machine 100 and towing vehicle 94. Operator 92 can illustratively interact with operator interface mechanisms 96 to manipulate and control vehicle 94, system 113, and some or all portions of machine 100.

Machine 100 is a row crop planting machine that illustratively includes a toolbar 102 that is part of a frame 104. FIG. 1 also shows that a plurality of planting row units 106 are mounted to the toolbar 102. Machine 100 can be towed behind towing vehicle 94, such as a tractor. FIG. 1 shows that material can be stored in a tank 107 and pumped through a supply line 111 so the material can be dispensed in or near the rows being planted. In one example, a set of devices (e.g., actuators) 109 is provided to perform this operation. For instance, actuators 109 can be individual pumps that service individual row units 106 and that pump material from tank 107 through supply line 111 so it can be dispensed on the field. In such an example, material application control system 113 controls the pumps 109.

In another example, actuators 109 are valves and one or more pumps 115 pump the material from tank 107 to valves 109 through supply line 111. In such an example, material application control system 113 controls valves 109 by generating valve or actuator control signals, e.g., on a per-seed basis, as described below. The control signal for each valve or actuator can, in one example, be a pulse width modulated control signal. The flow rate through the corresponding valve 109 can be based on the duty cycle of the control signal (which controls the amount of time the valve is open and closed). The flow rate through the valve can be based on multiple duty cycles of multiple valves or based on other criteria. The control signal can be a different type of control signal as well, instead of a pulse width modulated control signal. Further, the material can be applied in varying rates on a per-seed or per-plant basis. For example, fertilizer may be applied at one rate when it is being applied at a location spaced from a seed location and at a second, higher, rate when it is being applied closer to the seed location. These are examples only.

Figure 2:
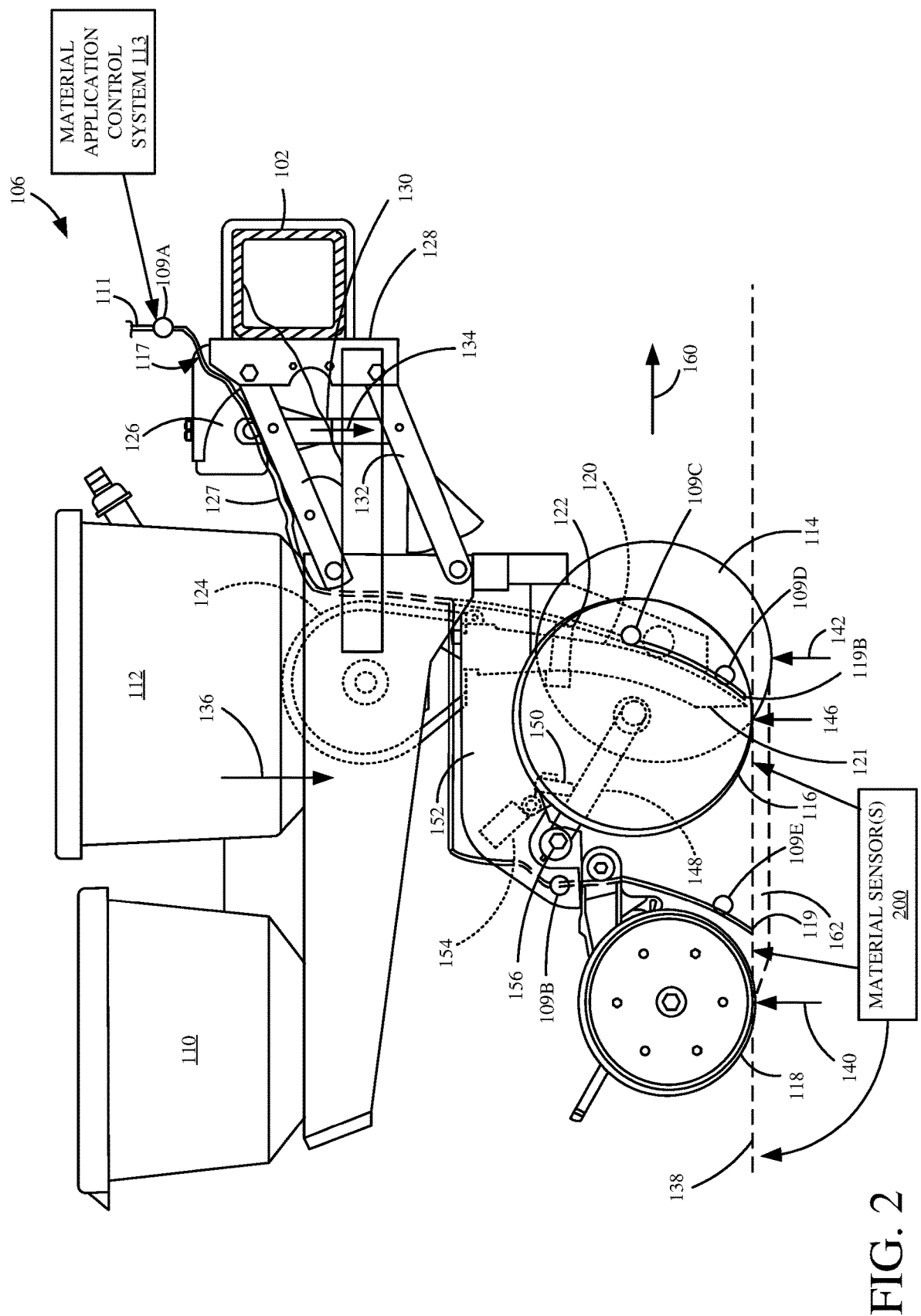
FIG. 2 is a side view showing one example of a row unit of the planting machine illustrated in FIG. 1.

FIG. 2 is a side view of one example of a row unit 106, with actuator 109 and system 113 shown as well. Actuator 109 is shown in five possible locations labeled as 109A, 109B, 109C, 109D and 109E. Row unit 106 illustratively includes a chemical tank 110 and a seed storage tank 112. It also illustratively includes one or more disc openers 114, a set of gauge wheels 116, and a set of closing wheels 118. Seeds from tank 112 are fed into a seed meter 124, e.g., by gravity or from a centralized commodity distribution system (e.g., exploiting pneumatic commodity distribution to each row unit). The seed meter 124 rotates in the direction indicated by arrow 188 and controls the rate at which seeds are dropped into a seed tube 120 or other seed delivery system, such as a brush belt or flighted belt (shown in FIGS. 6-7, respectively), from seed storage tank 112. The seeds can be sensed by a seed sensor 122.

In the example shown in FIG. 2, liquid material is passed, e.g., pumped or otherwise forced, through supply line 111 to an inlet end of actuator 109. Actuator 109 is controlled by control system 113 to allow the liquid to pass from the inlet end of actuator 109 to an outlet end.

As liquid passes through actuator 109, it travels through an application assembly 117 from a proximal end (which is attached to an outlet end of actuator 109) through a conduit 127 to a distal tip (or application tip) 119 (two different examples of which are shown as 119A and 119B), where the liquid is discharged into a trench, or proximate a trench or furrow 162, opened by disc opener 114 (as is described in more detail below).

FIG. 2 also shows one or more material sensor(s) 200 that may be placed at any of a variety of different locations to detect material applied through application assembly 117. Material sensor(s) 200 can take a wide variety of different forms, some of which are discussed below. The material sensor(s) 200 detect the material so the relationship between where the material is applied and where it should be applied can be identified and actions can be taken based on the relationship.

Some parts of row unit 106 will now be discussed in more detail. First, it will be noted that there are different types of seed meters 124, and the one that is shown is shown for the sake of example only and is described in greater detail below. However, in one example, each row unit 106 need not have its own seed meter. Instead, metering or other singulation or seed dividing techniques can be performed at a central location, for groups of row units 106. The metering systems can include finger pick-up discs and/or vacuum meters (e.g., having rotatable discs, rotatable concave or bowl-shaped devices), among others. The seed delivery system can be a gravity drop system (such as seed tube 120 shown in FIG. 2) in which seeds are dropped through the seed tube 120 and fall (via gravitational force) through the seed tube and out the outlet end 121 into the seed trench 162. Other types of seed delivery systems may be or may include assistive systems, in that they do not simply rely on gravity to move the seed from the metering system into the ground. Instead, such assistive systems actively assist the seeds in moving from the meter to a lower opening, where they exit or are deposited into the ground or trench. These can be systems that physically capture the seed and move it from the meter to the outlet end of the seed delivery system or they can be pneumatic systems that pump air through the seed tube to assist movement of the seed. The air velocity can be controlled to control the speed at which the seed moves through the delivery system. Some examples of assistive systems are described in greater detail below with respect to FIGS. 6 and 7.

A downforce actuator 126 is mounted on a coupling assembly 128 that couples row unit 106 to toolbar 102. Actuator 126 can be a hydraulic actuator, a pneumatic actuator, a spring-based mechanical actuator or a wide variety of other actuators. In the example shown in FIG. 2, a rod 130 is coupled to a parallel linkage 132 and is used to exert an additional downforce (in the direction indicated by arrow 134) on row unit 106. The total downforce (which includes the force indicated by arrow 134 exerted by actuator 126, plus the force due to gravity acting on row unit 106, and indicated by arrow 136) is offset by upwardly directed forces acting on closing wheels 118 (from ground 138 and indicated by arrow 140) and disc opener 114 (again from ground 138 and indicated by arrow 142). The remaining force (the sum of the force vectors indicated by arrows 134 and 136, minus the force indicated by arrows 140 and 142) and the force on any other ground engaging component on the row unit (not shown), is the differential force indicated by arrow 146. The differential force may also be referred to herein as the downforce margin. The force indicated by arrow 146 acts on the gauge wheels 116. This load can be sensed by a gauge wheel load sensor, which may be located anywhere on row unit 106 where it can sense that load. The gauge wheel load sensor can also be placed where it may not sense the load directly, but a characteristic indicative of that load. For example, the gauge wheel load sensor can be disposed near a set of gauge wheel control arms (or gauge wheel arm) 148 that movably mount gauge wheels 116 to shank 152 and control an offset between gauge wheels 116 and the discs in double disc opener 114, to control planting depth.

Arms (or gauge wheel arms) 148 illustratively abut against a mechanical stop (or arm contact member-or wedge) 150. The position of mechanical stop 150 relative to shank 152 can be set by a planting depth actuator assembly 154. Control arms 148 illustratively pivot around pivot point 156 so that, as planting depth actuator assembly 154 actuates to change the position of mechanical stop 150, the relative position of gauge wheels 116, relative to the double disc opener 114, changes, to change the depth at which seeds are planted.

In operation, row unit 106 travels generally in the direction indicated by arrow 160. The double disc opener 114 opens a furrow 162 in the soil 138, and the depth of the furrow 162 is set by planting depth actuator assembly 154, which, itself, controls the offset between the lowest parts of gauge wheels 116 and disc opener 114. Seeds are dropped through seed tube 120, into the furrow 162 and closing wheels 118 close the furrow 162, e.g., push soil back into the furrow 162.

As the seeds are dropped through seed tube 120, the seeds can be sensed by seed sensor 122. Some examples of seed sensor 122 may include an optical or reflective sensor, which includes a radiation transmitter component and a receiver component. The transmitter component emits electro-magnetic radiation and the receiver component then detects the radiation and generates a signal indicative of the presence or absence of a seed adjacent the sensors. In another example, row unit 106 may be provided with a seed firmer that is positioned to travel through the furrow 162, after seeds are placed in furrow 162, to firm the seeds in place. A seed sensor can be placed on the seed firmer and generate a sensor signal indicative of a seed. Some additional examples of seed sensors are described in greater detail below.

The present description proceeds with respect to the seed sensor being located to sense a seed passing it in seed tube 120, but this is for the sake of example only. Material application control system 113 illustratively receives a signal from seed sensor 122, indicating that a seed is passing sensor 122 in seed tube 120. Material application control system 113 then determines when to actuate actuator 109 so that material being applied through application assembly 117 (and out distal tip 119A or 119B of application assembly 117) will be applied at a desired location relative to the seed in trench or furrow 162. One example of how to determine when to actuate actuator 109 will now be described.

Material application control system 113 illustratively is programmed with, or detects a distance, e.g., a longitudinal distance, that the distal tip 119A or 119B is from the exit end 121 of seed tube 120. System 113 also illustratively senses, or is provided with (e.g., by another component, such as a GPS unit or a tractor, etc.), the ground speed of row unit 106. As the row units 106 on an implement being towed by a prime mover (e.g., a tractor) may move faster or slower than the tractor during turns, particularly as the width of the implement increases, the material application control system 113 may sense or be provided the ground speed of each row unit 106 of the implement. By way of example, the material application control system 113 may sense or be provided information when the implement is turning right indicating that the rightmost row unit 106 is travelling slower, i.e., has a lower ground speed, than the leftmost row unit 106. Further, the material application control system 113 detects, is provided, or is programmed with, system data indicating the responsiveness of actuator 109 under certain conditions (such as under certain temperature conditions, certain humidity conditions, certain elevations, when spraying a certain type of fluid, etc.) and system 113 also detects, is provided, or programmed with one or more properties of the material being applied through actuator 109 (as this may affect the speed at which actuator 109 responds, the time it takes for the material to travel through application assembly 117 to the distal tip 119A or 119B and be applied to furrow 162, etc.). Further, material application control system 113 illustratively detects (or is provided with a sensor signal indicative of) the forward speed of row unit 106 in the direction generally indicated by arrow 160.

With this type of information, once system 113 receives a seed sensor signal indicating that a seed is passing sensor 122 in seed tube 120, system 113 determines the amount of time it will take for the seed to drop through the outlet end of seed tube 121 and into furrow 162 to reside at its final seed location and position in furrow 162. System 113 then determines when tip 119A or 119B will be in a desired location relative to that final seed location and system 113 generates a signal to control actuation of valve 109 to apply the material at the desired location. By way of example, it may be that some material is to be applied directly on the seed. In that case, system 113 times the actuation of actuator 109 so that the applied material will be applied at the seed location. In another example, it may be desirable to apply some material at the seed location and also a predetermined distance on either side of the seed location. In that case, system 113 generates the signal to control actuator 109 so that the material is applied in the desired fashion. In other examples, it may be that the material is to be applied at a location between seeds in furrow 162. By way of example, relatively high nitrogen fertilizer may be most desirably applied between seeds, instead of directly on the seeds. In that case, system 113 has illustratively been programmed with the desired location of the applied material, relative to seed location, so that it can determine when to actuate actuator 109 in order to apply the material between seeds. Further, as discussed above, actuator 109 can be actuated to dispense material at a varying rate. Actuator 109 can be actuated to dispense more material on the seed location and less at locations spaced from the seed location, or vice versa, or according to other patterns.

It will be noted that a wide variety of different configurations are contemplated herein. For instance, in one example, FIG. 2 shows that actuator 109 may be placed closer to the distal tip 119A or 119B (such as indicated by actuator 109D and 109E). In this way, there is less uncertainty as to how long it will take the material to travel from the actuator 109D and 109E to the distal tip 119A or 119B. The valve may be disposed at different locations on seed tube 120 as indicated by actuator 109C or 109D. In such a scenario, again, actuator 109C or 109D is closer to the distal tip 119B and the material may be applied before and/or after the seed drops into furrow 162. For instance, when seed sensor 120 detects a seed, system 113 may be able to actuate valve 109C or 109D to apply material to furrow 162, before the seed exits the exit end 121 of seed tube 120. However, by the time the seed drops through distal end 121 of seed tube 120, the final seed location may be directly on the applied material. In yet another example, system 113 can control actuator 109C or 109D so that it applies material, but then stops applying it before the seed exits distal end 121. In that case, the material may be applied at a location behind the seed in furrow 162, relative to the direction indicated by arrow 160. This actuation timing enables the material to be applied between seeds, on seeds, or elsewhere. Similarly, the actuator 109 may be placed at other locations, such as actuator 109B, as well. Also, multiple actuators 109 with multiple application assemblies 117 can be used to dispense multiple materials or more materials than can be dispensed using a single actuator 109 and dispensing assembly 117. All of these and other configurations are contemplated herein.

Figure 3:
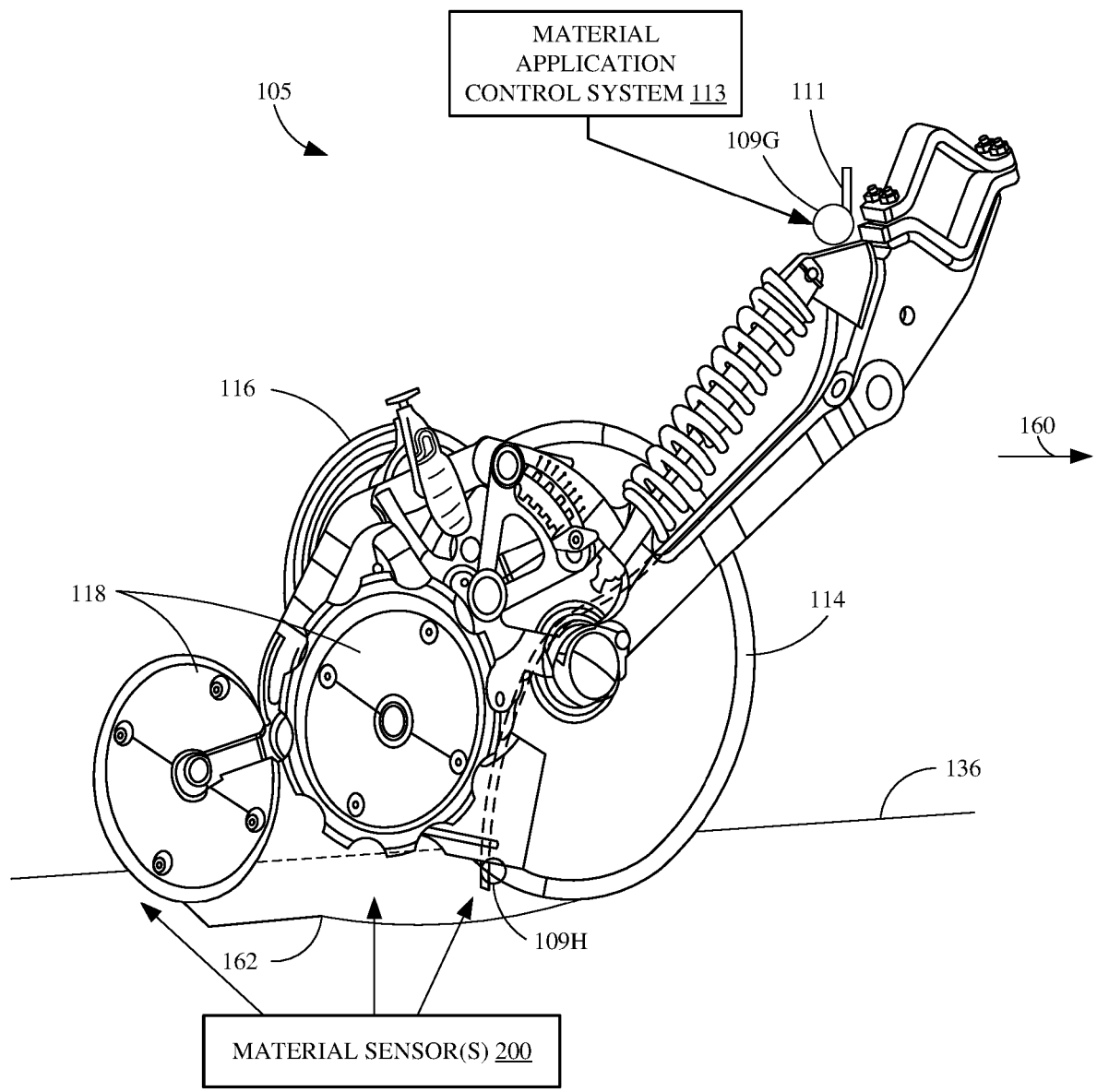
FIG. 3 is a view of an application unit.

FIG. 3 is a side perspective view of an applicator unit 105. Some items are similar to those shown in FIG. 2 and they are similarly numbered. Briefly, in operation, applicator unit 105 attaches to a side-dress bar that is towed behind a towing vehicle 94, so unit 105 travels between rows (if the rows are already planted). However, instead of planting seeds, it simply applies material at a location between rows of seeds (or, if the seeds are not yet planted, between locations where the rows will be, after planting). When traveling in the direction indicated by arrow 160, disc opener 114 (in this example, it is a single disc opener) opens furrow 162 in the ground 136, at a depth set by gauge wheel 116. When actuator 109 (two locations are shown at 109G and 109H) is actuated, material is applied in the furrow 162 and closing wheels 118 then close the furrow 162.

As unit 105 moves, material application control system 113 controls actuator 109 to dispense material. Dispensing material can be done relative to seed or plant locations, if they are sensed or are already known or have been estimated. Dispensing material can also be done before the seed or plant locations are known. In this latter scenario, the locations where the material is applied can be stored so that seeds can be planted later, relative to the locations of the material that has been already dispensed.

Material sensor(s) 200 can sense the applied material so a determination can be made as to whether the material was applied to the correct spot. Action signals can be generated as well. Some examples of material sensor(s) 200 are described elsewhere.

FIG. 3 shows that actuator 109 can be mounted to one of a plurality of different positions on unit 105. Two of the positions are shown at 109G and 109H. These are examples and the actuator 109 can be located elsewhere as well. Similarly, multiple actuators can be disposed on unit 105 to dispense multiple different materials or to dispense it in a more rapid or more voluminous way than is done with only one actuator 109.

Figure 4:
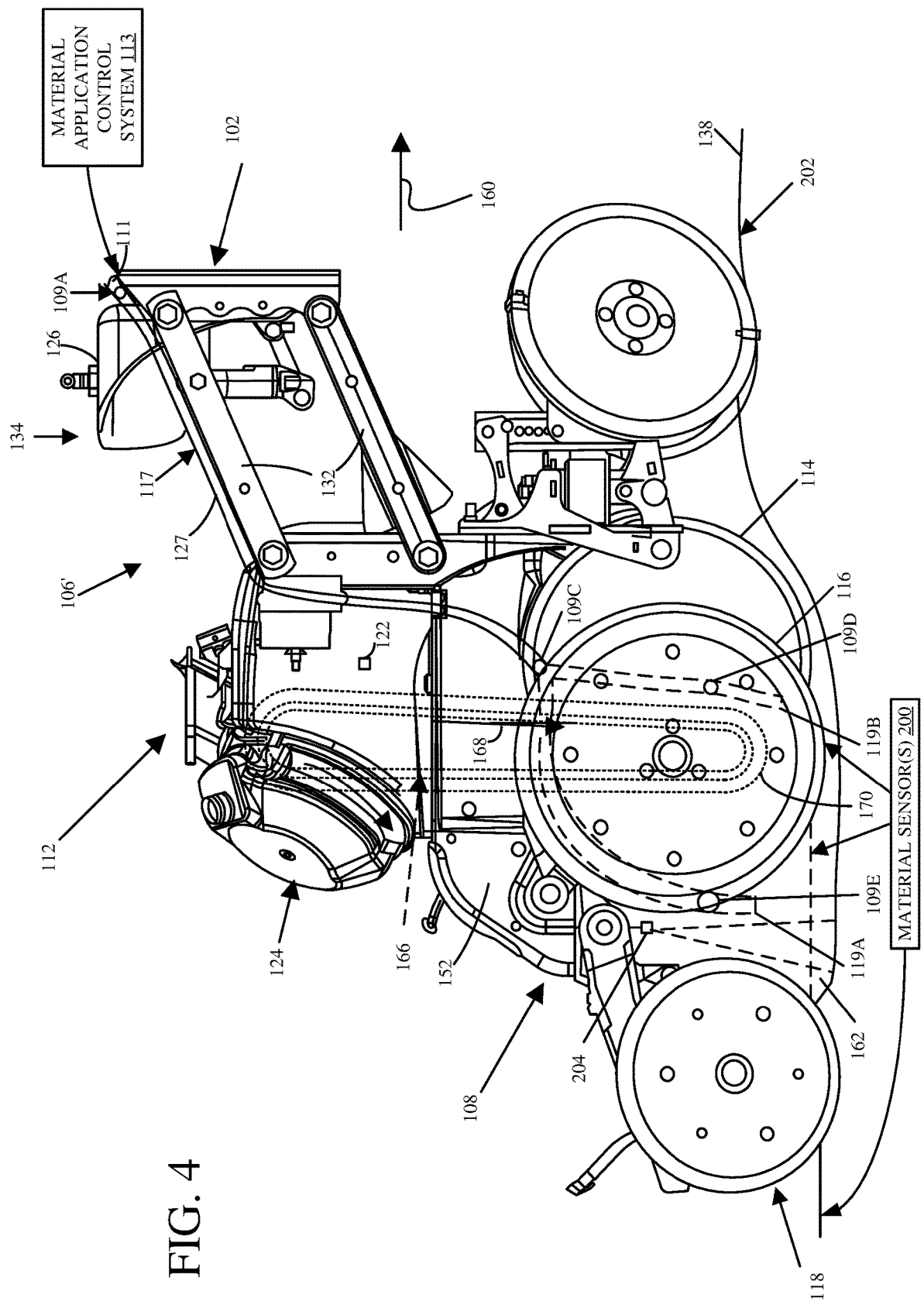
FIG. 4 is a side view showing another example of a row unit of the planting machine illustrated in FIG. 1.

FIG. 4 shows another example of a row unit 106' which is similar, in some ways, to the row unit 106 shown in FIG. 2, and similar items are similarly numbered. However, instead of the seed delivery system being a seed tube 120, which relies on gravity to move the seed to the furrow 162, the seed delivery system shown in FIG. 4 is an assistive seed delivery system 166. Assistive seed delivery system 166 also illustratively has a seed sensor 122 disposed therein. Assistive seed delivery system 166 captures the seeds as they leave seed meter 124 and moves the seeds in the direction indicated by arrow 168 toward furrow 162. System 166 has an outlet end 170 where the seeds exit assistive system 166, into furrow 162, where the seeds again reach their final resting location.

In such a system, material application control system 113 considers the speed at which delivery system 166 moves the seed from seed sensor 122 to the exit end 170. System 113 also illustratively considers the speed at which the seed moves from the exit end 170 into furrow 162. For instance, in one example the seed simply drops from exit end 170 into furrow 162 under the force of gravity. In another example, however, the seed can be ejected from delivery system 166 at a greater or lesser speed than that which would be reached under the force of gravity. Similarly, it may be that the seed drops straight downward into furrow 162 from the outlet end 170. In another example, however, it may be that the seed is propelled slightly rearwardly from the outlet end 170, to accommodate for the forward motion of the row unit 106', so that the travel path of the seed is more vertical and so the seed rolls less once it reaches the furrow. Further, the seed can be ejected rearwardly and trapped against the ground by a trailing member (such as a pinch wheel) which functions to stop any rearward movement of the seed, after ejection, and to force the seed into firm engagement with the ground. Again, FIG. 4 also shows that valve 109 can be placed at any of a wide variety of different locations, some of which are illustrated by values 109A, 109C, 109D and 109E. There can also be more than one seed sensor 122, seed sensors of different types, seed sensors deployed at different locations, etc.

FIG. 4 also shows that row unit 106' can have a row cleaner 202. Row cleaner 202 can take many different forms and is shown as a set of cleaning wheels that remove residue from surface 138 ahead of opener 114. Further, FIG. 4 shows material sensor(s) 200. In one example, sensors 200 can include a sensor 204 (such as a camera, spectroscopy sensor, temperature sensor, electrical property sensor, beam break sensor, or other sensor) that senses the applied material as or after it exits the distal tip 119A or 119B of the application assembly 117. In another example, sensor(s) 200 can be pressure sensor(s) or flow sensors mounted to sense the pressure or flow of the material being applied. The pressure sensors on flow sensors can sense a pressure or flow of material as it is being applied (e.g., existing actuator 109 or a corresponding nozzle), a pressure drop across or flow through actuator 109, pressure pulses in material application assembly 117, or another pressure sensor or flow sensor. Other examples of sensors 200 are described in more detail elsewhere herein.

Figure 5:
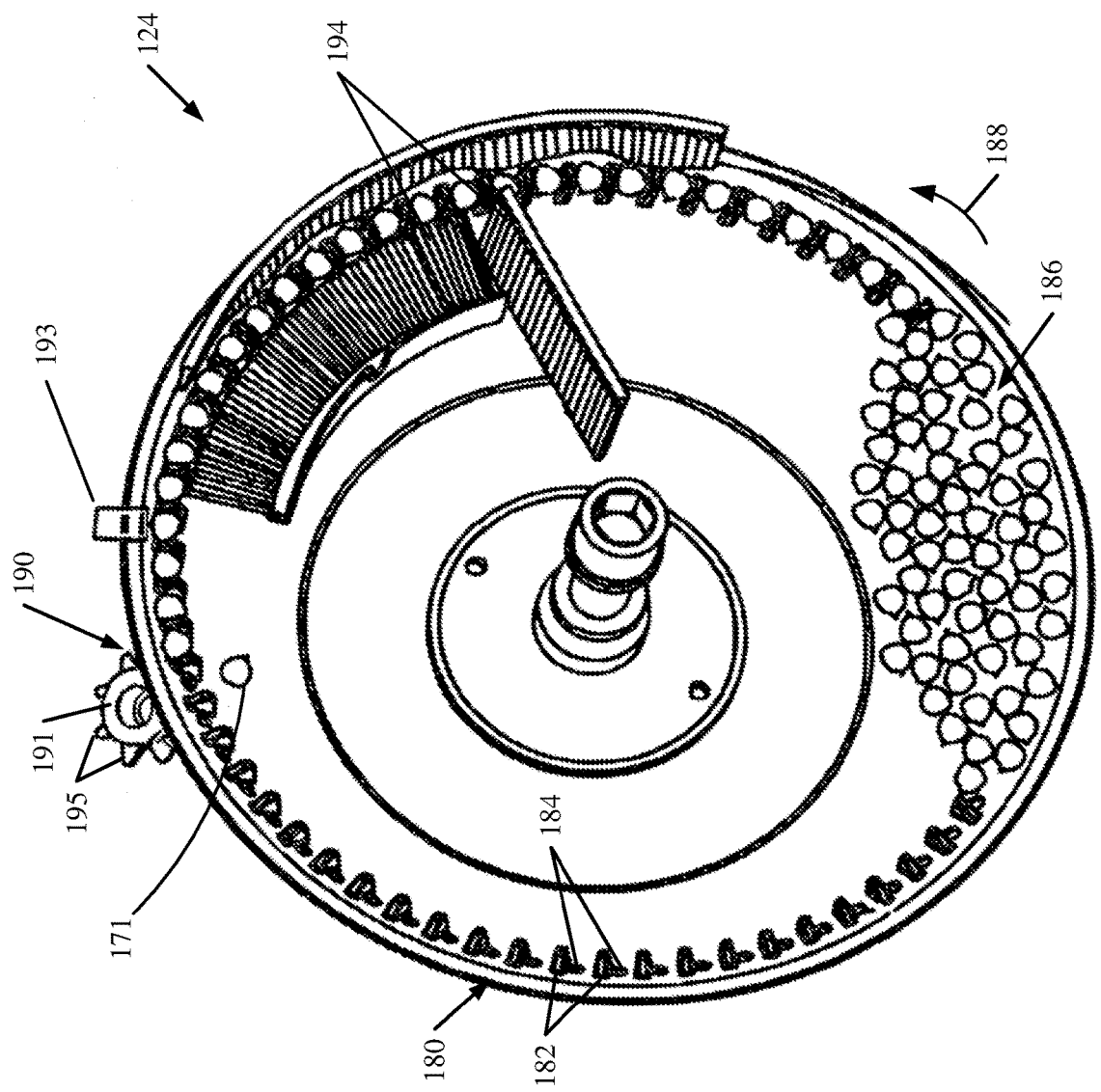
FIG. 5 is a perspective view of a portion of a seed metering system.

FIG. 5 shows one example of a rotatable mechanism that can be used as part of the seed metering system (or seed meter) 124. The rotatable mechanism includes a rotatable disc, or concave element, 180. Rotatable element 180 has a cover (not shown) and is rotatably mounted relative to the frame of the row unit 106 or 106'. Rotatable element 180 is driven by a motor (not shown) and has a plurality of projections or tabs 182 that are closely proximate corresponding apertures 184. A seed pool 186 is disposed generally in a lower portion of an enclosure formed by rotating mechanism 180 and its corresponding cover. Rotatable element 180 is rotatably driven by its motor (such as an electric motor, a pneumatic motor, a hydraulic motor, etc.) for rotation generally in the direction indicated by arrow 188, about a hub. A pressure differential is introduced into the interior of the metering mechanism so that the pressure differential influences seeds from seed pool 186 to be drawn to apertures 184. For instance, a vacuum can be applied to draw the seeds from seed pool 186 so that they come to rest in apertures 184, where the vacuum holds them in place. Alternatively, a positive pressure can be introduced into the interior of the metering mechanism to create a pressure differential across apertures 184 to perform the same function.

Once a seed comes to rest in (or proximate) an aperture 184, the vacuum or positive pressure differential acts to hold the seed within the aperture 184 such that the seed is carried upwardly generally in the direction indicated by arrow 188, from seed pool 186, to a seed discharge area 190. It may happen that multiple seeds are residing in an individual seed cell. In that case, a set of brushes or other members 194 that are located closely adjacent the rotating seed cells tend to remove the multiple seeds so that only a single seed is carried by each individual cell. Additionally, a seed sensor 193 can also illustratively be mounted adjacent to rotating element 180. Seed sensor 193 generates a signal indicative of seed presence and this may be used by system 113, as will be discussed in greater detail below.

Once the seeds reach the seed discharge area 190, the vacuum or other pressure differential is illustratively removed, and a positive seed removal wheel or knock-out wheel 191, can act to remove the seed from the seed cell. Wheel 191 illustratively has a set of projections 195 that protrude at least partially into apertures 184 to actively dislodge the seed from those apertures. When the seed is dislodged (such as seed 171), it is illustratively moved by the seed tube 120, seed delivery system 166 (some examples of which are shown above in FIGS. 2-4 and below in FIGS. 6 and 7) to the furrow 162 in the ground.

Figure 6:
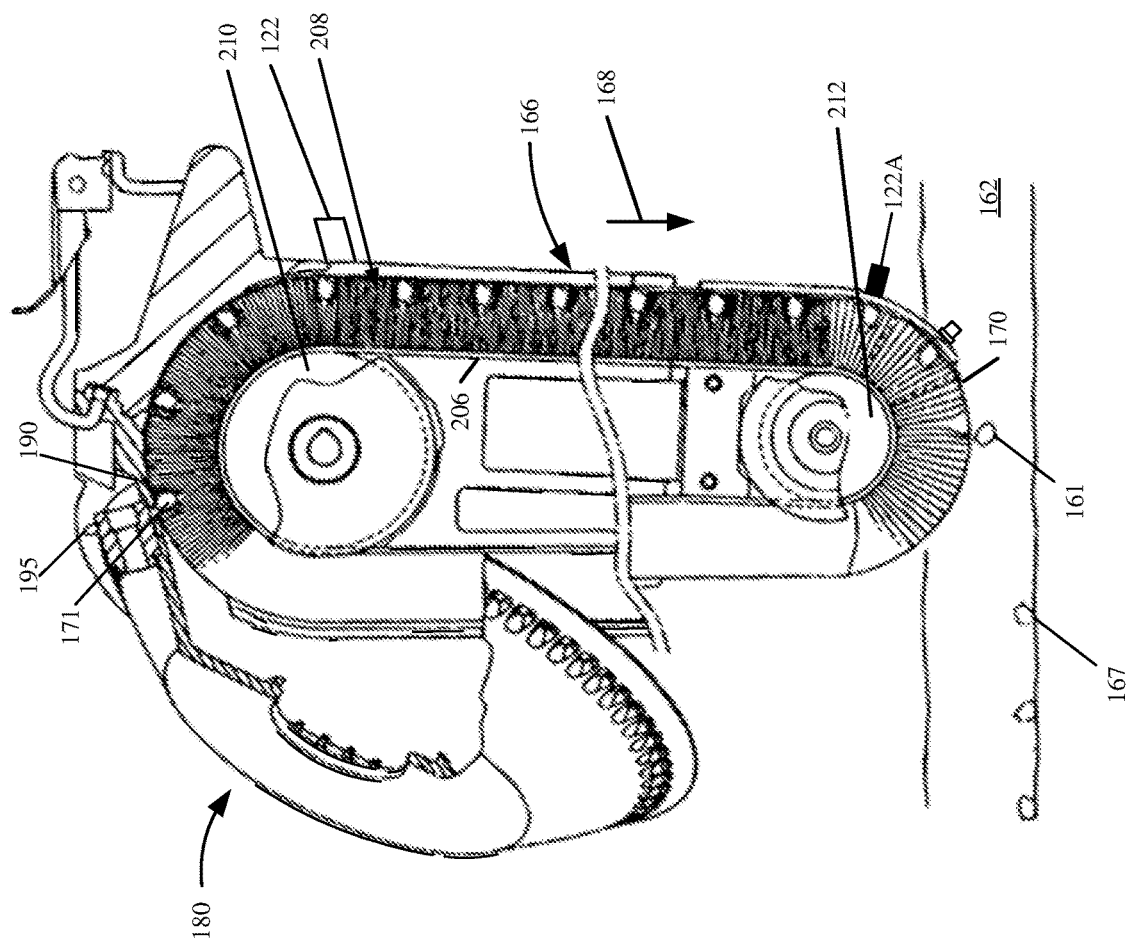
FIG. 6 shows an example of a seed delivery system that can be used with a seed metering system.

FIG. 6 shows an example of a seed metering system and a seed delivery system, in which the rotating element 180 is positioned so that its seed discharge area 190 is above, and closely proximate, seed delivery system 166. In the example shown in FIG. 6, seed delivery system 166 includes a continuous transport mechanism such as a belt 206 with a brush that is formed of distally extending bristles 208 attached to belt 206 that act as a receiver for the seeds. Belt 206 is mounted about pulleys 210 and 212. One of pulleys 210 and 212 is illustratively a drive pulley while the other is illustratively an idler pulley. The drive pulley is illustratively rotatably driven by a conveyance motor, which can be an electric motor, a pneumatic motor, a hydraulic motor, etc. Belt 206 is driven generally in the direction indicated by arrow 168

Therefore, when seeds are moved by rotating element 180 to the seed discharge area 190, where they are discharged from the seed cells in rotating element 180, the seeds are illustratively positioned within the bristles 208 by the projections 182 that push the seed into the bristles 208. Seed delivery system 166 illustratively includes walls that form an enclosure around the bristles 208, so that, as the bristles 208 move in the direction indicated by arrow 168, the seeds are carried along with the bristles from the seed discharge area 190 of the metering mechanism, to an outlet end or a discharge area 170 either at ground level, or below ground level within the trench or furrow 162 that is generated by the furrow opener 114 on the row unit 106. FIG. 6 shows seeds 167 in furrow 162, seed 161 moving from outlet end 170 to furrow 162, and additional seeds in bristles 208.

Additionally, a seed sensor 122 is also illustratively coupled to seed delivery system 166. As the seeds are moved within bristles 208, sensor 122 can detect the presence or absence of a seed. It should also be noted that while the present description will proceed as having sensors 122, and 193, it is expressly contemplated that, in another example, only one sensor is used. Or additional sensors can also be used. Similarly, the seed sensor 122 shown in FIG. 6 can be disposed at a different location, such as that shown at 122A. Having the seed sensor closer to where the seed is ejected from the system can reduce error in identifying the final seed location. Again, there can be multiple seed sensors, or different kinds of seed sensors, and the seed sensor(s) can be located at many different locations.

Figure 7:
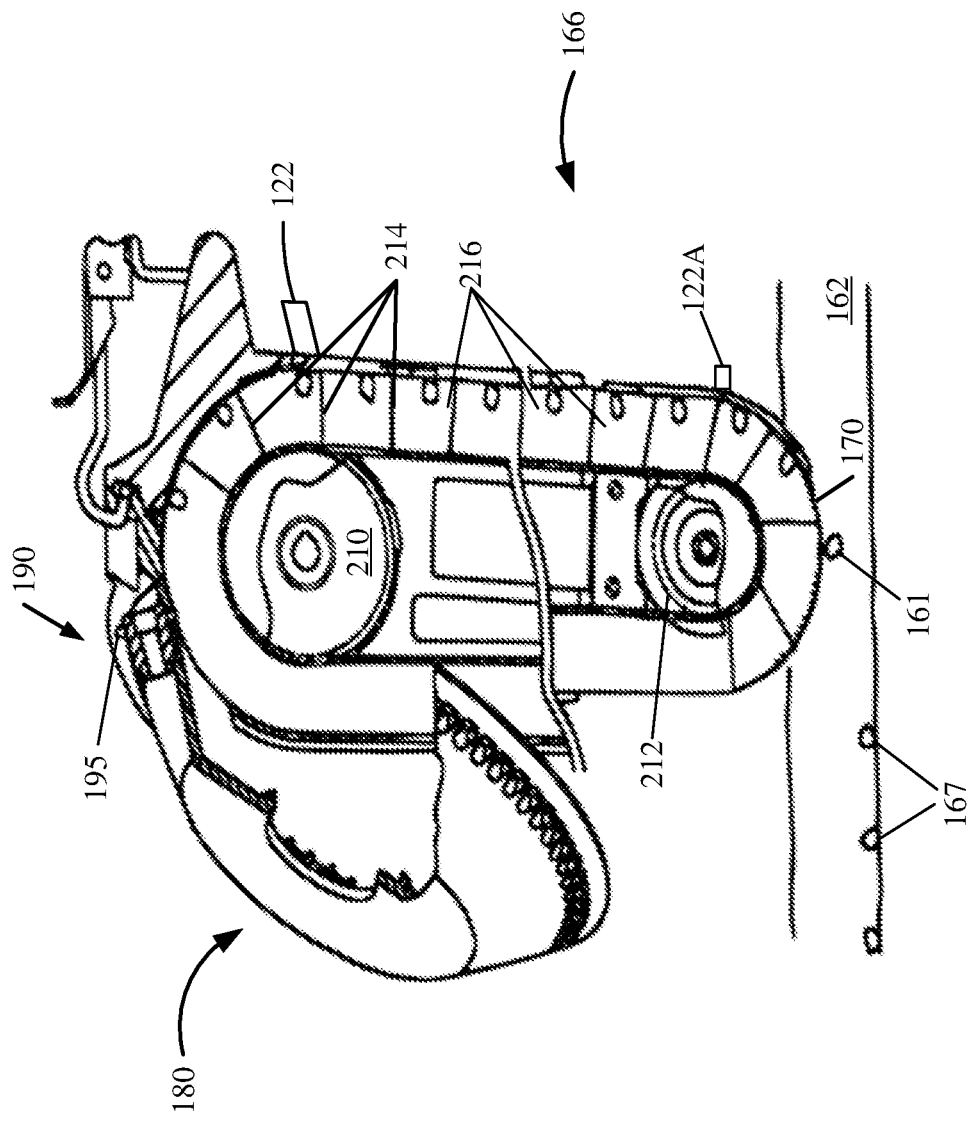
FIG. 7 shows another example of a seed delivery system that can be used with a seed metering system.

FIG. 7 is similar to FIG. 6, except that seed delivery system 166 does not include a belt with distally extending bristles. Instead, it includes a flighted belt (a continuous transport mechanism) in which a set of paddles 214 form individual chambers (or receivers 216), into which the seeds are dropped, from the seed discharge area 190 of the metering mechanism 180. The flighted belt moves the seeds from the seed discharge area 190 to the exit end 170 of the flighted belt, within the trench or furrow 162.

There are a wide variety of other types of delivery systems as well, that include a transport mechanism and a receiver that receives a seed. For instance, they include dual belt delivery systems in which opposing belts receive, hold, and move seeds to the furrow, a rotatable wheel that has sprockets, which catch seeds from the metering system and move them to the furrow, multiple transport wheels that operate to transport the seed to the furrow, and an auger, among others. The present description will proceed with respect to an endless member (such as a brush belt, a flighted belt) and/or a seed tube, but many other delivery systems are contemplated herein as well.

Before continuing with the description of applying material relative to seed location and detecting material placement, a brief description of some examples of seed sensors 122, 122A and 193 will first be provided. Sensors 122, 122A and 193 are illustratively coupled to seed metering system 124 and seed delivery system 120, 166. Sensors 122, 122A and 193 sense an operating characteristic of seed metering system 124 and seed delivery systems 120, 166. In one example, sensors 122, 122A and 193 are seed sensors that are each mounted at a sensor location to sense a seed within seed tube 120, seed metering system 124, and delivery system 166, respectively, as the seed passes the respective sensor location. In one example, sensors 122, 122A, and 193 are optical or reflective sensors and thus include a transmitter component and a receiver component. The transmitter component emits electromagnetic radiation into seed tube 120, seed metering system 124, and/or delivery system 166. In the case of a reflective sensor, the receiver component then detects the reflected radiation and generates a signal indicative of the presence or absence of a seed adjacent to sensor 122, 122A, and 193 based on the reflected radiation. With other sensors, radiation such as light, is transmitted through the seed tube 120, seed metering system 124, or the delivery system 166. When the light beam is interrupted by a seed, the sensor signal varies, to indicate a seed. Thus, each sensor 122, 122A, and 193 generates a seed sensor signal that pulses or otherwise varies, and the pulses or variations are indicative of the presence of a seed passing the sensor location proximate the sensor.

For example, in regards to sensor 122, bristles 208 pass sensor 122 and are colored to absorb a majority of the radiation emitted from the transmitter. As a result, absent a seed, reflected radiation received by the receiver is relatively low. Alternatively, when a seed passes the sensor location where sensor 122 is mounted, more of the emitted light is reflected off the seed and back to the receiver, indicating the presence of a seed. The differences in the reflected radiation allow for a determination to be made as to whether a seed is, in fact, present. Additionally, in other examples, sensors 122, 122A, and 193 can include a camera and image processing logic that allow visual detection as to whether a seed is present within seed metering system 124, seed tube 120, and/or seed delivery system 166, at the sensor location proximate the sensor. They can include a wide variety of other sensors (such as RADAR or LIDAR sensors) as well.

For instance, where a seed sensor is placed on a seed firmer, it may be mechanical or other type of sensor that senses contact with the seed as the sensor passes over the seed. Also, while the speed of the seed in the delivery system (or as it is ejected) can be identified by using a sensor that detects the speed of the delivery system, in some examples, the speed and/or other characteristics of movement of the seed can be identified using seed sensors. For instance, one or more seed sensors can be located to sense the speed of movement of the seed, its trajectory or path, its instantaneous acceleration, its presence, etc. This can be helpful in scenarios in which the seed delivery system changes speed.

Figure 8:
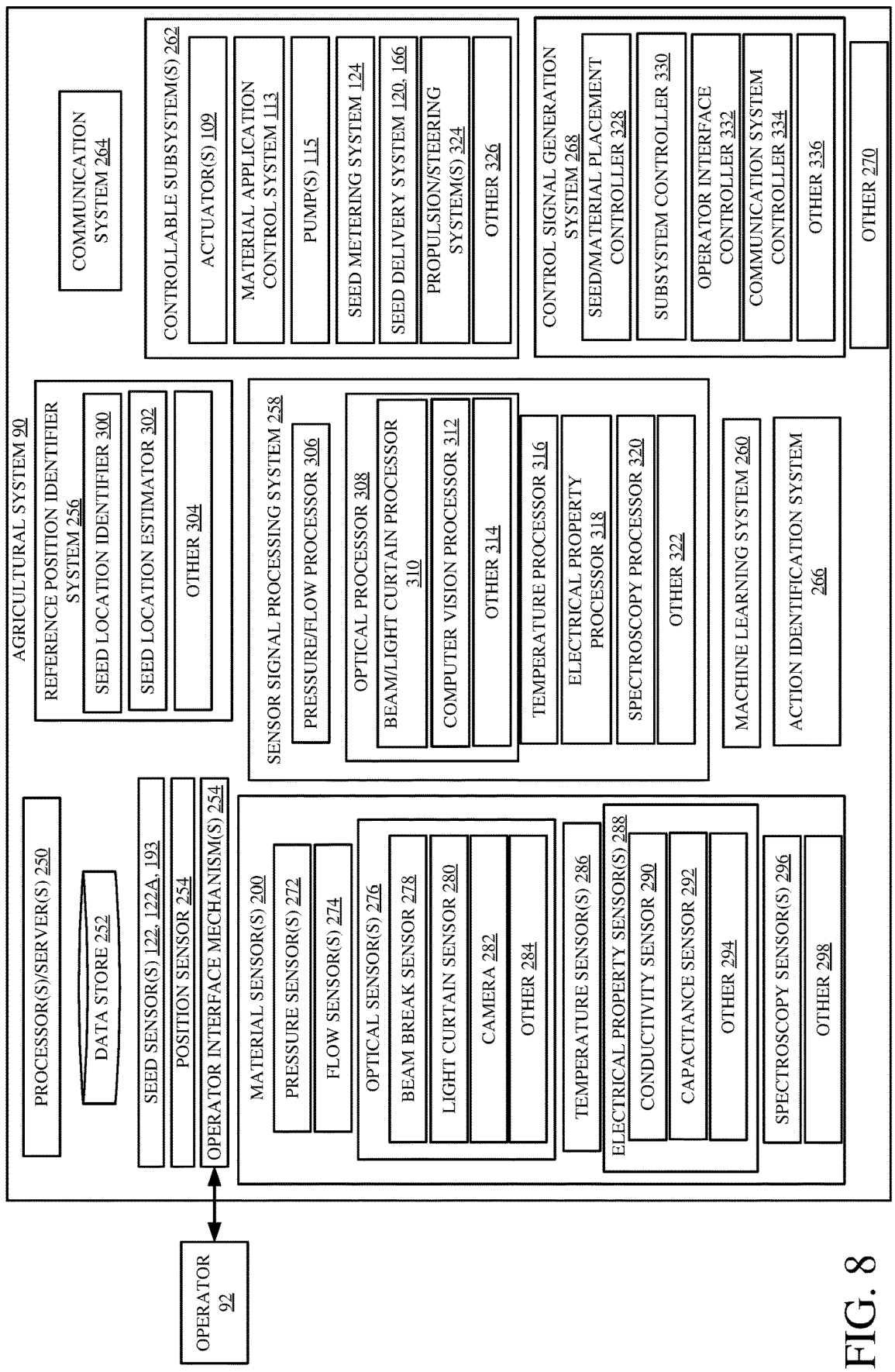
FIG. 8 is a block diagram showing one example of a portion of the agricultural system illustrated in FIG. 1.

FIG. 8 is a block diagram of one example of agricultural system 90 (shown in FIG. 1), and items that are similar to those shown in FIG. 1 are similarly numbered in FIG. 8. It will be noted that some of the items in FIG. 8 can be deployed on the towing vehicle 94. Some of the items can be deployed on planting machine 100. Some of the items in FIG. 8 can be deployed on remote computing systems that are in communication with system 90. The items in FIG. 8 can be all located in one place, or they can be distributed. FIG. 8 shows that agricultural system 90 can include one or more processors or servers 250, data store 252, one or more of the seed sensors 122, 122A and 193, position sensor 254, operator interface mechanisms 196, material sensors 200, reference position identifier system 256, sensor signal processing system 258, machine learning system 260, controllable subsystems 262, communication system 264, action identification system 266, control signal generation system 268, and other items 270.

Material sensors 200 can include a wide variety of different types of sensors. FIG. 8 shoes that, in one example, material sensors 200 can include one or more pressure sensors 272. Sensors 200 can include one or more flow sensors 274 or optical sensors 276. Optical sensors 276 can include beam break sensors 278, light curtain sensors 280, one or more cameras 282, or other items 284. Sensors 200 can also include one or more temperature sensors 286, electrical property sensors 288 (which, themselves, can include conductivity sensor 290, capacitance sensor 292, and other sensors 294), spectroscopy sensor 296, and other sensors 298. Reference position identifier system 256 can include seed location identifier 300, seed location estimator 302, and other items 304. Sensor signal processing system 258 can include pressure/flow processor 306, optical processor 308 (which can, itself, include beam/light curtain processor 310, computer vision processor 312, and other items 314), temperature processor 316, electrical property processor 318, spectroscopy processor 320, and/or other items 322.

Controllable subsystems 262 can include actuators 109, pumps 115, material application control system 113, seed metering system 124, seed delivery system 120, 166, propulsion/steering subsystems 324, and other items 326. Control signal generation system 268 can include seed/material placement controller 328, subsystem controller 330, operator interface controller 332, communication system controller 334, and other items 336. Before describing the overall operation of agricultural system 90 in more detail, a brief description of some of the items in agricultural system 90 and their operation will first be described.

Seed sensors 122, 122A, and 193 have been described above. Position sensor 294 can be a global navigation satellite system (GNSS) receiver or another sensor that provides a location or position of agricultural system 90 within a global or local coordinate system. For instance, sensor 254 can be a cellular triangulation sensing system, a dead reckoning system, or another type of position sensor.

Operator interface mechanisms 96 can include such things as levers, a steering wheel, pedals, joysticks, buttons, knobs, or linkages. Mechanisms 96 can include output mechanism, such as user interface display mechanisms and input mechanisms, such as buttons, icons, or links that can be actuated using a point and click device or touch gestures (where the operator interface display is a touch sensitive display). Mechanisms 96 can include a speaker and microphone (where speech recognition and/or speech synthesis are provided), and other audio, visual, and/or haptic mechanisms.

As discussed above, material sensors 200 sense a location of the applied material. In one example, the location can be sensed relative to a location of the seed, or in other ways. Pressure sensor 272 can be a pressure sensor that is located on a valve or other actuator 109 to sense when material is applied through the valve or actuator 109. The pressure sensors may sense a pressure drop across the valve or actuator 109, the pressure of material exiting the valve or actuator 109, the pressure of material in the application assembly 117, or another pressure sensor.

Flow sensor 274 can be a flow sensor that senses the flow of material through an application assembly 117. For instance, flow sensor 274 can be disposed on a valve or other actuator 109 to sense flow of material through the valve or actuator 109. Flow sensor 274 can be disposed to sense flow of material through the conduit forming a portion of application assembly 117, or flow sensor 274 can be disposed to sense flow of material exiting the distal tip 119 of application assembly 117. Flow sensor 274 can be implemented in other ways as well.

Optical sensor 276 can sense the application of material, so that the location of the applied material can be identified, in one of a variety of different ways using optical techniques. Beam break sensor 278 illustratively provides a transmitter and a receiver or detector. The transmitter transmits electromagnetic radiation to the receiver or detector. When the transmission is interrupted by something passing between the transmitter and receiver, then beam break sensor 278 provides a signal indicating this. Therefore, beam break sensor 278 can be configured to detect material exiting the outlet end 119 of application assembly 117 by directing a beam from the transmitter to the receiver that will be broken by material exiting the distal tip 119. Similarly, beam break sensor 278 can be configured within the conduit of application assembly 117 so that dust or other obscurants do not generate inadvertent signals (which may be more likely in an example where beam break sensor 278 is deployed external to application assembly 117). Beam break sensor 278 can also be deployed in other locations to detect application of material.

Light curtain sensor 280 can be configured to generate a light curtain of electromagnetic radiation. When an object passes through the light curtain, light curtain sensor 280 generates a signal indicative of the object passing through the light curtain. Therefore, the light curtain sensor 280 can be arranged to deploy the light curtain in an area to detect material being applied.

Camera 282 can be any of a wide variety of different types of cameras. Camera 282 can be a visible light camera, an infrared camera, a mono camera, a stereo camera, or another type of camera. Camera 282 can capture an image that, when processed, indicates the presence of the applied material. The image can thus be an image of the furrow after the material is applied, an image of the outlet end 119 of the application assembly 117, or another image that can be processed to identify applied material. Also, an additive maybe added to the material to make optical identification of the material easier. For instance, a certain color additive may be combined with the material either before it is applied, or during the application process, so that the color of the applied material (with the additive) provides a significant contrast with the agricultural surface to which it is applied.

Temperature sensors 286 can detect the material based upon sensed temperature. For instance, the material can be heated or cooled so that its temperature differs from the surrounding environment, after it is applied. Also, the temperature of the material may be sufficiently different from the surrounding environment so that heating or cooling is not needed. The temperature sensor 286 can then sense the temperature in an area where the material is applied to identify the location of the applied material. The temperature sensor 286 may be an infrared sensor, or another type of temperature sensor.

Electrical property sensor 288 senses an electrical property that can be used to identify the location of the applied material. For example, the conductivity or capacitance of a substance may vary based upon whether the material is present or absent from that substance. Conductivity sensor 290 may thus be configured to generate a conductivity sensor signal indicative of a sensed conductivity of the soil proximate where the material has been added. The conductivity sensor signal can be processed to identify whether the material is present. Capacitance sensors 292 can be configured to generate a capacitance sensor signal indicative of the capacitance measured in the area proximate where the material is added. The capacitance sensor signal can be processed to identify the pressure of the material that is added.

Spectroscopy sensor 296 illustratively analyzes the wavelengths of the region of interest (the region of the agricultural surface where material is applied). The material applied illustratively has different frequencies and amplitudes of wavelength than the soil. The wavelengths are sensed by spectroscopy sensor 296 and the applied material can be distinguished from the soil based on characteristics of the sensed wavelengths.

Reference position identifier system 256 identifies a reference position so that the material application control system 113 can control actuators 109 to apply the material, where desired, given the reference position. The reference position may, for example, be the seed locations. Seed location identifier 300 identifies the location of seed in the furrow. The location of seeds can be identified using the signals from seed sensors 122, 122A, 193, or in other ways. Seed location estimator 302 generates an estimate of the location of the seed. For instance, a seed map can be provided indicating where the planting machine is to plant seeds. That map can be used by the planter to release seeds at the mapped locations. However, the seed map contains estimated seed locations, instead of actual seed locations. Thus, the seed location estimator 302 can obtain estimated seed locations from a seed map, or based on other criteria.

Sensor signal processing system 258 receives the sensor signal from one or more of the material sensors 200 and processes the signals to identify where the applied material is located relative to the reference position generated by reference position identifier system 256. For instance, where the reference position is the seed location, and where the applied material is fertilizer that is to be applied on the seed location, then sensor signal processing system 258 identifies the applied material and whether the applied material has been applied at the seed location, based upon the received sensor signals. Similarly, where the material is to be applied between the reference positions, then sensor signal processing system 258 identifies the applied material and determines whether it is between the reference locations.

Sensor signal processing system 258 can include pressure/flow processor 306. Processor 306 receives a sensor signal from pressure sensor 272 and/or flow sensor 274, and identifies the location where the material is applied, based upon the pressure signal from sensor 272 or the flow signal from sensor 274. For instance, where pressure sensor 272 generates a pressure signal indicative of a pressure pulse (which itself may be indicative of material being applied by material application system 117), this information can be provided to processor 306. The pressure signal will indicate not only the pressure variation, but the time for which the pressure varied (e.g., the length of the pressure pulse). Seed location identifier 300 may generate a signal indicating when a seed sensor sensed a seed. Based upon the time it takes the applied material to reach its final location on the ground, the time it takes the seed to reach its final location on the ground and the speed of machine 100, processor 306 can determine the position of the applied material relative to the position of the seed. Furthermore, the pressure signal can be correlated to the position signal from position sensor 254 so that a map can be generated identifying where the material has been applied.

The pressure signal can also be integrated over time to obtain an indication of the volume (or amount) of material that was dispensed as well. In this way, the geospatial location of the applied material and the seed can be identified and the amount of applied material can also be identified. This can be used to generate a map, adjust system settings, make recommendations to the operator as to control adjustments, and in other ways, which are described below.

Optical processor 308 processes the optical sensor signal from one or more of sensors 276. Beam break sensor 278 and light curtain sensor 280 generate a signal indicating that material has passed through an optical beam or light curtain (respectively). The precise time at which the beam or light curtain was blocked can be compared to the time when the seed sensor 122, 122A and 193 detected the seed and it can also be correlated to the position signal from position sensor 254. The duration with which the beam or light curtain was blocked can be used to estimate the volume (or amount) of material dispensed. Based on the correlation between when the material is sensed to when the seed is sensed, and based upon the time it takes for the material and seed to reach the final locations, the location of the material that is applied to the field can be compared to the location of the seed in the furrow. An action can be identified and control signals can be generated to perform the identified action.

Camera 282 captures images of the material as it is being placed or after it has been placed on the agricultural surface. A signal indicative of the captured images is provided to computer vision processor 312 which processes the images to identify the presence of the material and its location on the agricultural surface. Computer vision processor 312 can also process the image to identify seeds in the image so that the location of the applied material, relative to the location of the seeds, can also be determined. Similarly, the surface area of the detected material can be used to identify a volume or amount of material. Computer vision processor 312 can use a variety of different mechanisms for extracting data from the images. For instance, red green blue (RGB) color analysis can be used. Similarly, edge detection can be used to extract data from the images. Neural networks and labeling networks or other classifiers can be used to identify data in the images as well.

Temperature processor 316 receives a temperature signal from temperature sensors 286. As discussed above, temperature sensor 286 can be used to identify the location and amount of the applied material using a non-contact sensor, such as an infrared beam sensor, or infrared scanning sensor. The infrared images show differences in temperature. The material may natural be a different temperature than the soil or surrounding area, or the material may be heated or cooled. In one example, for instance, a liquid material is heated as it passes through the pump and material application system 117. A non-contact infrared temperature sensor 286 is used to detect the temperature in the area of interest (e.g., on the agricultural surface where the material is applied) and a sensor signal generated by temperature sensor 286 is provided to temperature processor 316. Processor 316 identifies the warmer area in the image and thus identifies that area as being a location that contains the applied material. The time and location can be correlated to the material identified in the image, as discussed above, and the information can be used to generate control signals, used for mapping, or used in other ways.

The electrical property sensors 288 generate a signal indicative of the sensed electrical property (e.g., electrical conductivity, electrical capacitance, etc.). The electrical properties of the material being applied may be different from that of the surrounding soil. Therefore, a measurement of local electrical conductance or electrical capacitance can indicate the location of the applied material. The area in which the measured electrical property indicates applied material can be used to identify the volume of material applied as well. Electrical property processor 318 thus receives the electrical property signal from one or more sensors 288 and correlates the location of the added material with the reference position (e.g., the seed location) can be used to generate maps, used to generate control signals, or can be used in other ways.

Spectroscopy sensor 296 can generate a spectroscopic image of the agricultural surface. The applied material will illustratively have different wavelength frequencies and amplitudes than the surrounding soil. Spectroscopy processor 320 analyzes the spectroscopic image or spectroscopy sensor signal and processes the signal to identify the frequencies and amplitudes at the various wavelengths to identify the added material. The area over which the material is detected can be used to generate an indication of volume (or another indication of amount), and the location of the material can be correlated to the reference position (e.g., seed location). The information can be used for mapping, to generate action signals, or in other ways.

The time it takes for the seed to reach its final position may depend on the speed of the seed delivery system, the speed of the seed metering system, the rate at which the seed falls or moves from the seed delivery system to the ground, the ground speed of the planting machines and other criteria. The time it takes for the material to reach its final position may depend on the speed at which the material leaves the tip 119, the properties (e.g., density, viscosity, droplet size, etc.) of the material, the ground speed of the planting machine, and other criteria. The criteria can be sensed or predetermined and used by sensor signal processing system 258 to identify the location of the applied material, the location of the seed or other reference location, the correlation between the location of the applied material and the location of the seed, and other items.

Based upon the information provided by sensor signal processing system 258, action identification system 266 then identifies actions that are to be taken. For instance, if the information from sensor signal processing system 258 indicates that the material is being added at a desired location, then an action may be to send that information to a mapping system for generation of maps, to send the information to a data store, or to send the information to other systems. The information may be sent to a remote computing system over a network, or in other ways. Also, if the information from sensor signal processing system 258 indicates that the material being added is misplaced relative to where desired, then the action identified by action identification system 266 may be to generate an alert for the operator 92 using operator interface mechanisms 96. Similarly, action identification system 266 may identify an action to generate a recommendation to operator 92 to make adjustments to settings, or to adjust other mechanisms. The action may be to automatically control or make adjustments to control signals to automatically adjust the agricultural system 90 or the material application control system 113 so that the relative position of the material being applied, relative to the reference position, can be changed to more closely match what is desired.

Action identification system 266 generates an output indicative of the identified action and provides that output to control signal generation system 268. Seed/material placement controller 328 can then generate control signals to control seed metering system 124, seed delivery system 120, 166, and/or propulsion/steering system 324 to control the position of the material being applied, relative to the position of the seed in the furrow. Controller 328 can also generate control signals to control actuator 109, pump 115, and/or material application control system 113 to control the location of the material being added relative the reference position. Similarly, controller 328 can control both the position of the seed and the position of the applied material relative to one another, based upon the output from action identification system 266.

Subsystem controller 330 can generate control signals to control any of the other controllable subsystems 262 as well. For instance, subsystem controller 330 may generate control signals to increase the engine speed of the propulsion system, to modify the heading of the machine, by controlling steering subsystem 324, or to control other subsystems.

Operator interface controller 332 can generate control signals to control operator interface mechanism 96. For example, the operator interface mechanisms 96 can be controlled to generate an alert for operator 92, to show representative images indicating where the added material is being applied relative to the reference position, or to recommend actions to take to improve the placement or modify the volume of the material being applied. Operator interface controller 332 can generate control signals to control operator interface mechanisms 96 in other ways as well.

Communication system controller 334 can generate control signals to control communication system 264. For instance, communication system controller 334 can generate control signals to control communication system 264 to send the information regarding the placement and volume of applied material, the reference position, and other things, to a remote computing system. The remote computing system can be used for map generation, or for other things.

Figure 9:
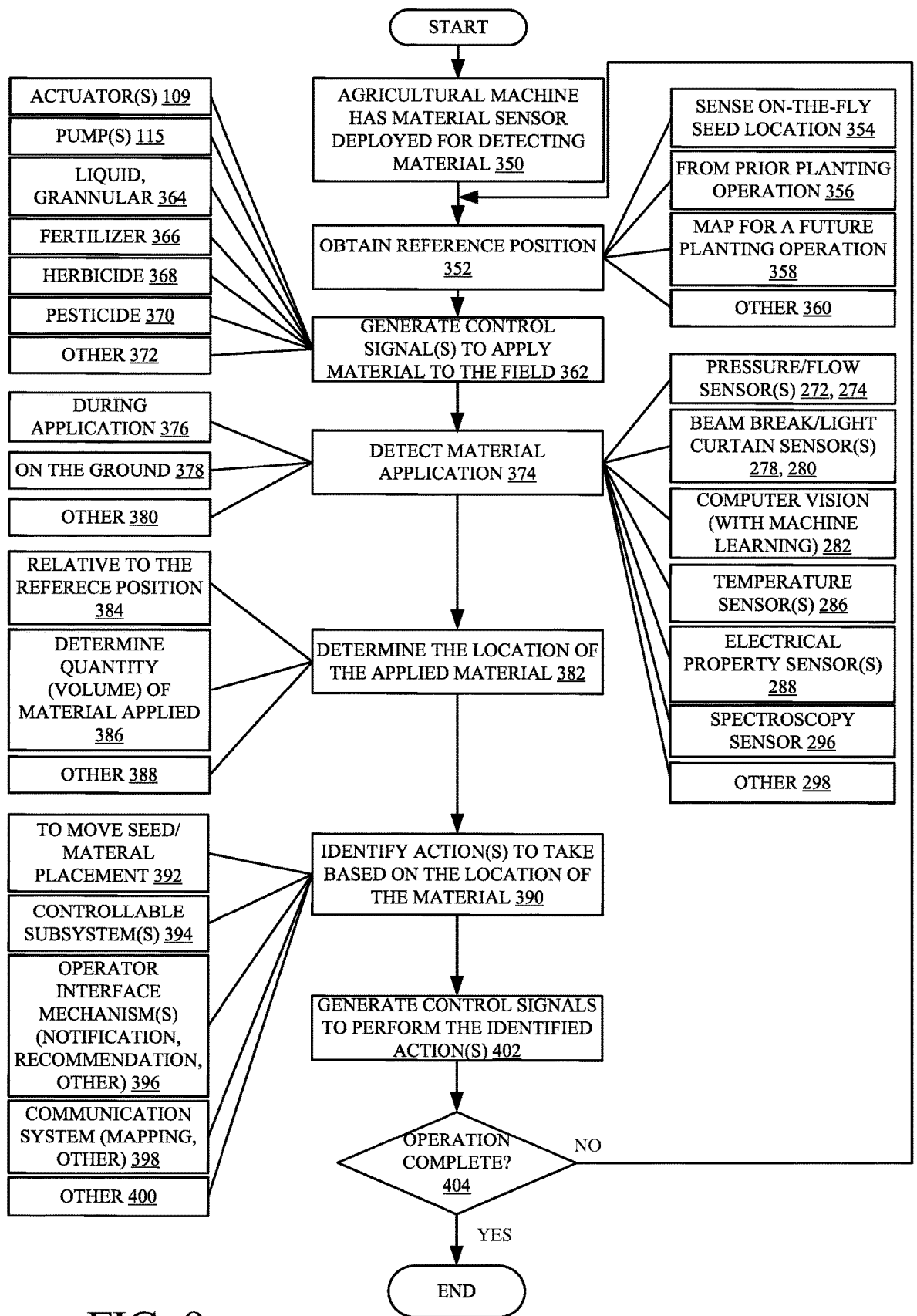
FIG. 9 is a flow diagram illustrating one example of the operation of the agricultural system.

FIG. 9 is a flow diagram illustrating one example of the operation of agricultural system 90 in applying material to the agricultural surface relative to a reference position, sensing the material placement, and also generating actions based upon the sensed material placement.

It is first assumed that agricultural system 90 has a material sensor 200 deployed for detecting or sensing the applied material. Having material sensors deployed for detecting the applied material is indicated by block 350 in the flow diagram of FIG. 9. Reference position identifier system 256 then obtains a reference position that can be correlated to the position of the applied material. Obtaining the reference position is indicated by block 352 in the flow diagram of FIG. 9. In one example, reference position identifier system 256 uses seed sensors 122, 122A, 193 to sense the seed location, on-the-fly, during the planting operation. Performing on-the-fly seed location sensing to obtain the reference position is indicated by block 354 in the flow diagram of FIG. 9. In another example, seed location identifier 300 can obtain, as the reference position, the seed location from a map or other data generated during a prior planting operation. By way of example, assume that the seeds were planted, and the material is then being applied during a subsequent operation. Obtaining the reference position from a prior planting operation is indicated by block 356 in the flow diagram of FIG. 9. Seed location estimator 302 can also generate, as the reference position, an estimated seed location. By way of example, a seed planting map, that has desired seed locations and that is to be used during planting, may be accessed by seed location estimator 302. The locations of the seeds on the seed planting map can be obtained as the estimated seed locations, where the seeds will reside after they are planted. Obtaining the reference position from a map used for a future planting operation is indicated by block 358 in the flow diagram of FIG. 9. Reference position identifier system 256 can obtain the reference position in other ways as well as indicated by block 360 in the flow diagram of FIG. 9.

Material application control system 113 then generates control signals to apply material to the agricultural surface (e.g., to the field). Generating control signals to apply material to the field is indicated by block 362 in the flow diagram of FIG. 9. System 113 can control actuators 109 and/or pumps 115 to apply material, based upon the reference position. In one example, the material being added may be liquid or granular material, as indicated by block 364. The material can be fertilizer 366, herbicide 368, pesticide 370, or other material 372.

Material sensors 200 then detect material application, as indicated by block 274. Detection can be based on an input from a single type of sensor or from a fused combination of sensors. The material sensors 200 can detect application of the material during application (such as by using pressure sensors 272, flow sensors 274, optical sensors 276, etc.). Detecting material application during the application of the material is indicated by block 376 in the flow diagram of FIG. 9. The material sensors 200 can also sense the applied material once it is on the ground, (such as by using optical sensor 276, temperature sensor 286, electrical property sensor 288, spectroscopy sensor 296, or other sensor) as indicated by block 378. The material application can be detected or sensed in other ways as well, as indicated by block 380.

The material sensors 200 can include pressure sensor 272 or flow sensor 274, beam break sensor 278 or light curtain sensor 280, computer vision sensor 282, temperature sensor 286, electrical property sensors 288, spectroscopy sensors 296 or other sensors 298. Also, additives can be added to the material so that they can be more easily detected by any of the material sensors 200, or other sensors.

Sensor signal processing system 258 then determines the location of the applied material based upon the sensor signals from one or more material sensors 200. The determination as to the location of the applied material can also be made based on other sensor signals, such as a signal from position sensor 254, from seed sensors 122, 122A, 193, from speed sensors that sense the speed of seed metering system 124 and/or seed delivery system 166, the speed of the planter based upon the speed of propulsion system 324, and/or other sensor signals. Determining the location of the applied material is indicated by block 382 in the flow diagram of FIG. 9.

In one example, the location of the applied material is identified relative to the reference position output by reference position identifier system 256. Identifying the position of the applied material relative to the reference position is indicated by block 384 in the flow diagram of FIG. 9. In yet another example, the sensor signal processing system 258 can determine the quantity (e.g., volume) of material that was applied based upon the sensor signals. Determining the quantity of material applied is indicated by block 386 in the flow diagram of FIG. 9. Determining the location of the applied material can be done in other ways as well, as indicated by block 388.

Once the location of the applied material has been determined by sensor signal processing system 258, action identification system 266 identifies one or more actions to take based upon the location of the applied material. Identifying the actions is indicated by block 390 in the flow diagram of FIG. 9. The actions, as previously mentioned, can be a wide variety of different types of actions. The seed/material placement controller 328 can generate control signals to move the seed and/or material placement, as indicated by block 392. The identified action can be to control any of the controllable subsystems 262 as well. Controlling the controllable subsystems is indicated by block 394 in the flow diagram of FIG. 9. The action can be to control one or more operator interface mechanisms 96, as indicated by block 396 in the flow diagram of FIG. 9. The identified action can be to control communication system 264 to communicate the information to other systems, such as a mapping system, or another system. Identifying the action as an action to control a communication system 264 is indicated by block 398 in the flow diagram of FIG. 9. Identifying actions based upon the location of the applied material can be done in other ways as well, as indicated by block 400.

Once the action is identified, control signal generation system 268 generates control signals to perform the identified action, as indicated by block 402. Processing continues, until the material application process operation is complete, as indicated by block 404.

It can thus be seen that the present description describes a system in which not only is material applied based upon a reference position, but the location of the material, relative to the reference position, is identified and actions are identified based upon that location. The location of the applied material can be identified using a wide variety of different types of sensors.

Figure 10:
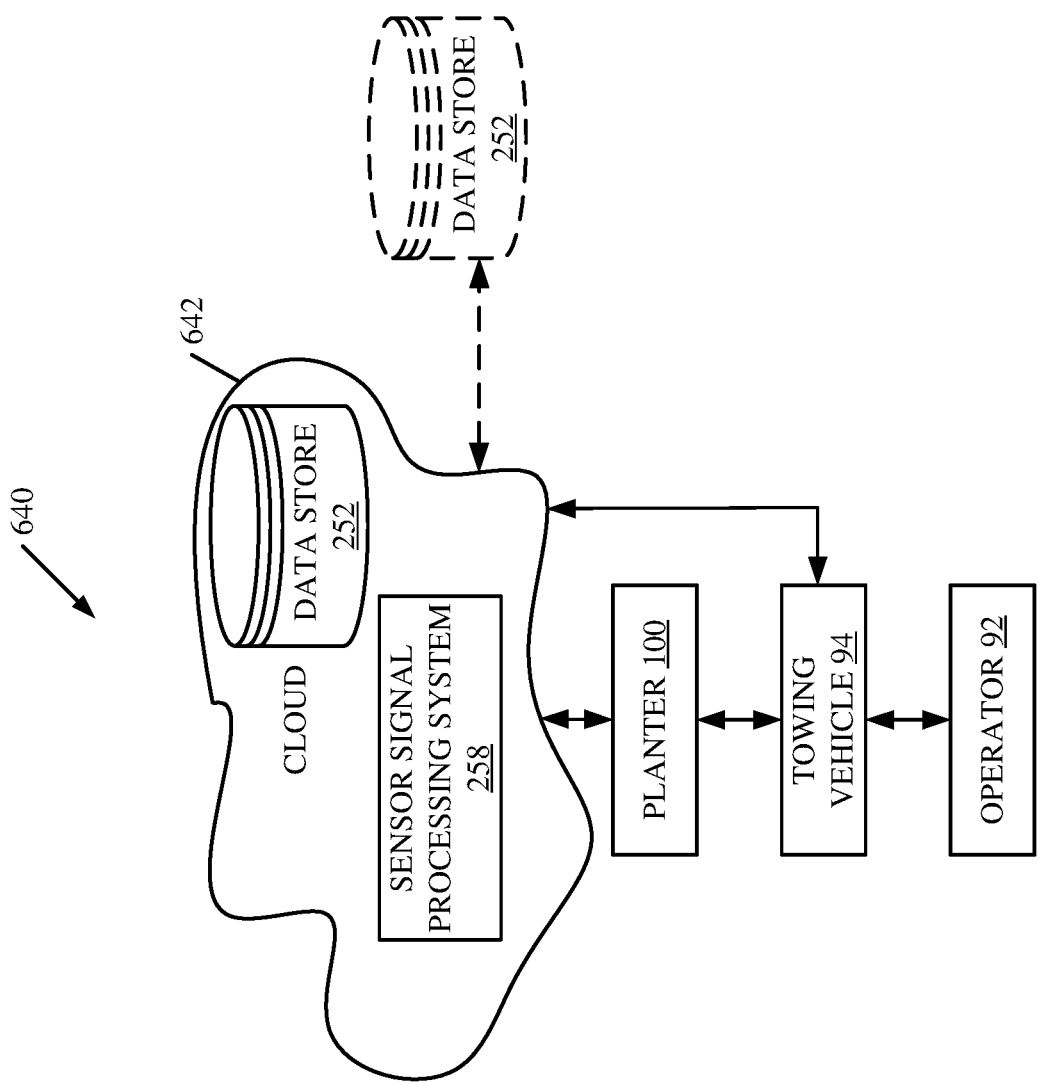
FIG. 10 shows one example of the agricultural system deployed in a remote server environment.

FIG. 10 is a block diagram of the agricultural system, shown in FIG. 1, except that it communicates with elements in a remote server architecture 6404. In an example, remote server architecture 640 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 8 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 10, some items are similar to those shown in FIGS. 1 and 8 and they are similarly numbered. FIG. 10 specifically shows that sensor signal processing system 258 and data store 252 can be located at a remote server location 642. Therefore, the remainder of system 94 accesses those systems through remote server location 642.

FIG. 10 also depicts another example of a remote server architecture. FIG. 10 shows that it is also contemplated that some elements of FIGS. 1 and 8 can be disposed at remote server location 642 while others are not. By way of example, data store 252 can be disposed at a location separate from location 642, and accessed through the remote server at location 642. Regardless of where portions of system 94 are located, they can be accessed directly by other items in system 94, through a network (either a wide area network or a local area network). Portions of system 94 can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the planter comes close to the fuel truck for fueling, the system automatically collects the information from the planter using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the planter until the planter enters a covered location. The planter, itself, can then send the information to the main network.

It will also be noted that the elements of FIGS. 1 and 8, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 11:
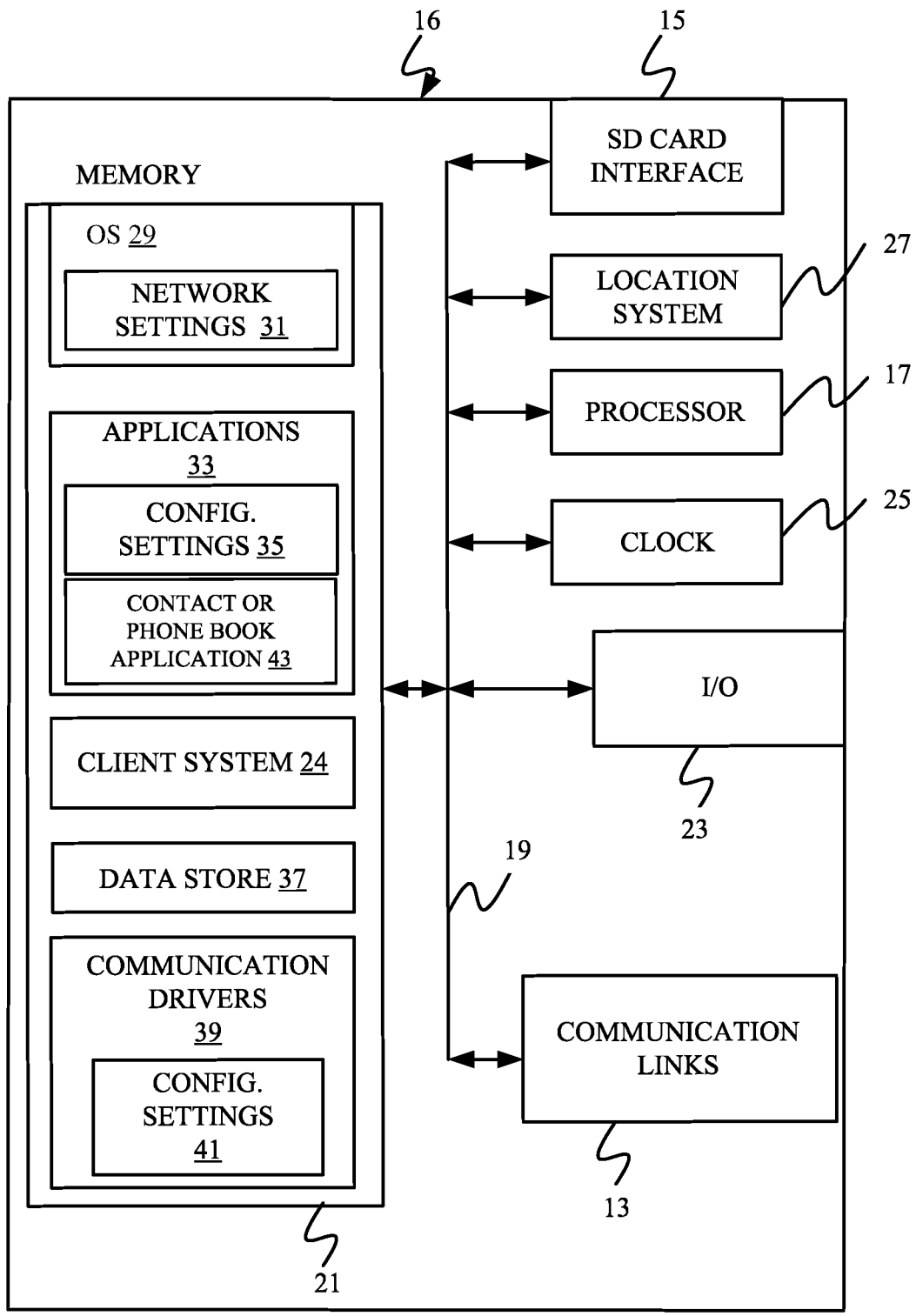
FIGS. 11-13 show examples of mobile devices that can be used as operator interface mechanisms in the architectures shown in the previous Figures.
Figure 12:
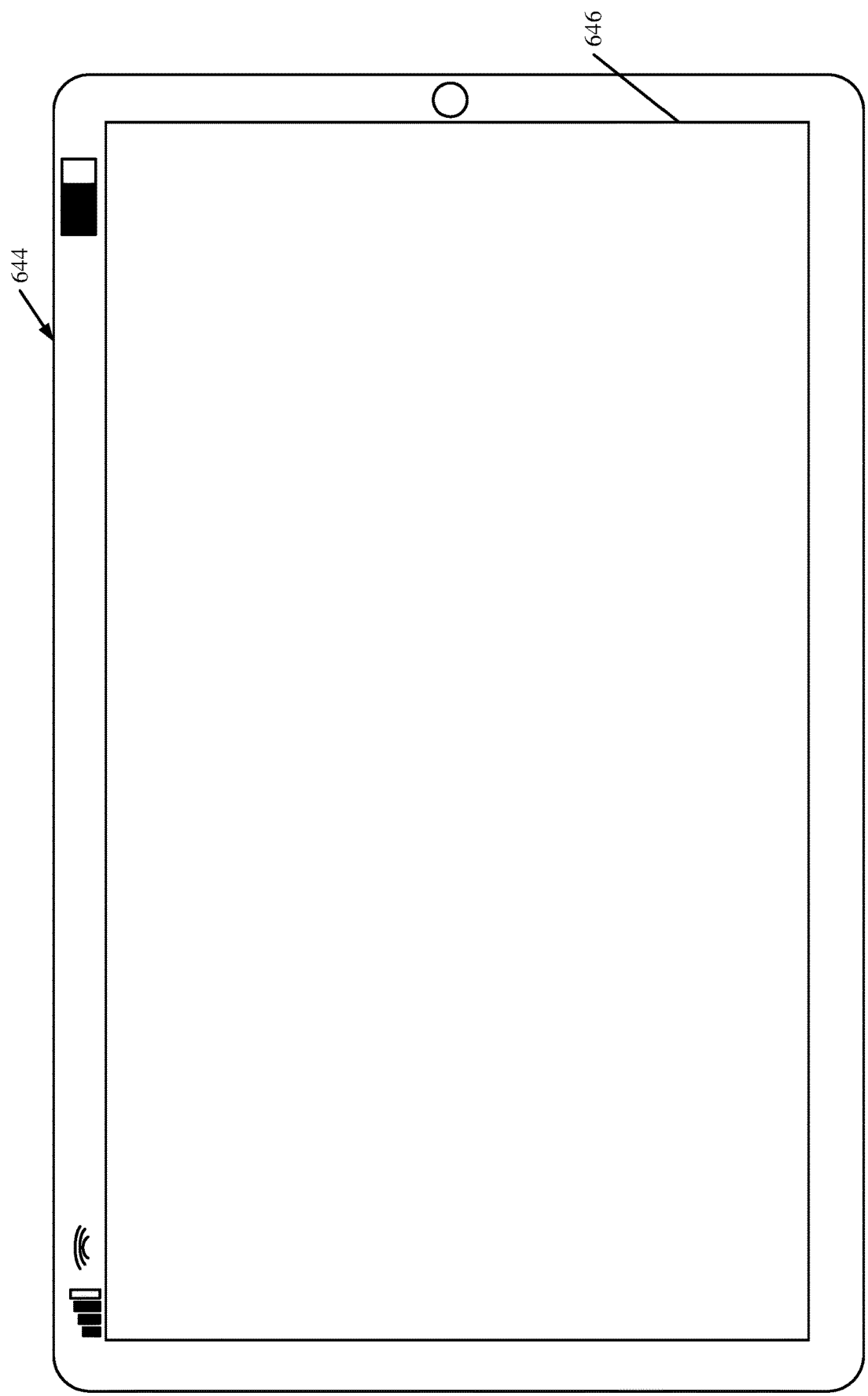
Figure 13:
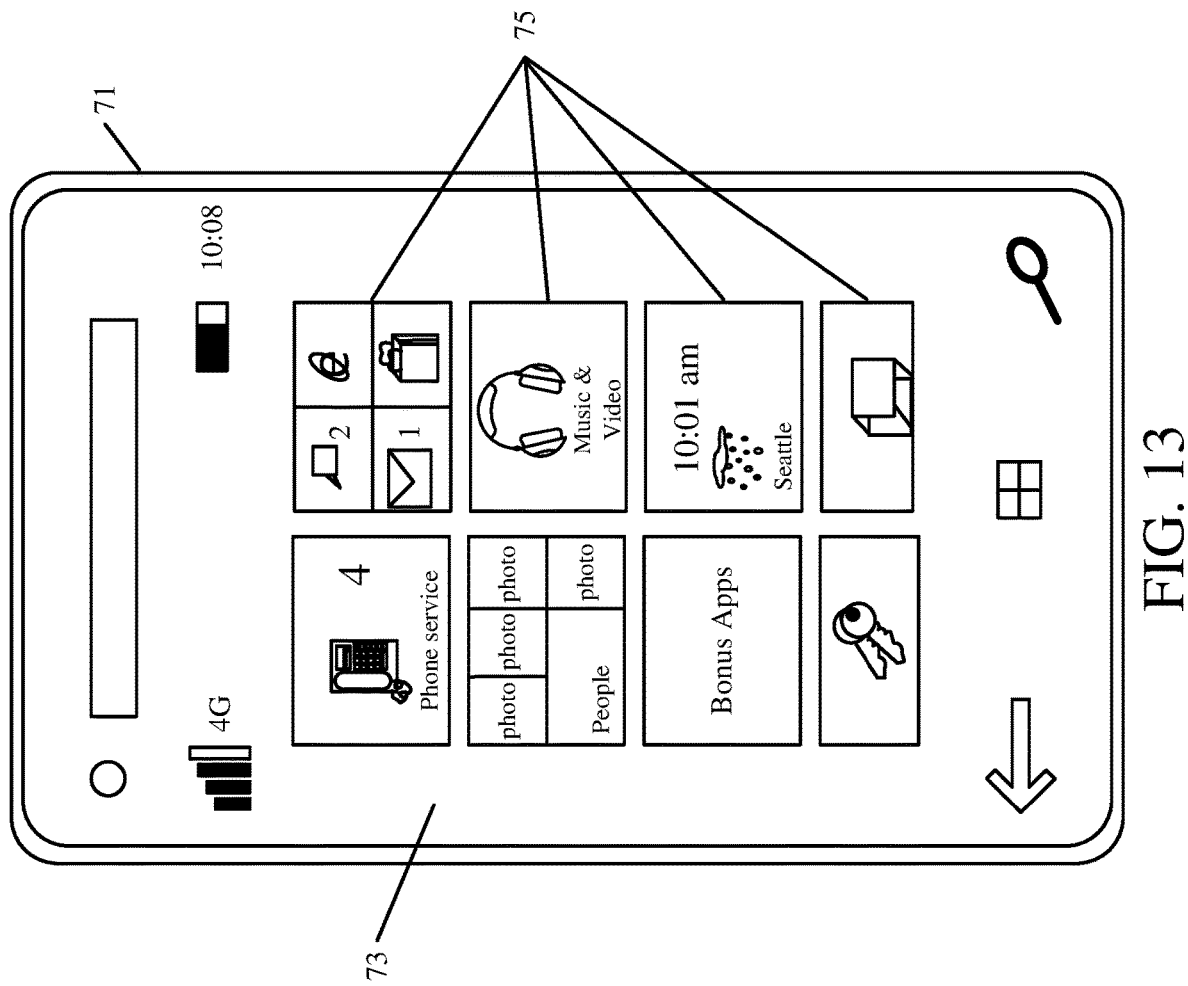

FIG. 11 is a simplified block diagram of one illustrative example of a handheld or mobile computing device that can be used as a user's or client's hand held device 16, in which the present system (or parts of it) can be deployed. For instance, a mobile device can be deployed in the operator compartment of towing vehicle 94 for use in generating, processing, or displaying the application data. FIGS. 12-13 are examples of handheld or mobile devices.

FIG. 11 provides a general block diagram of the components of a client device 16 that can run some components shown in FIGS. 1 and 8, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. Clock 25 can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. System 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 12 shows one example in which device 16 (from FIG. 11) is a tablet computer 644. In FIG. 12, computer 644 is shown with user interface display screen 646. Screen 646 can be a touch screen or a pen-enabled interface that receives inputs from a pen or stylus. Inputs can also be received from an on-screen virtual keyboard. Of course, computer 644 might also be attached to a keyboard or other user input device through a suitable attachment mechanism, such as a wireless link or USB port, for instance. Computer 644 can also illustratively receive voice inputs as well.

FIG. 13 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 14:
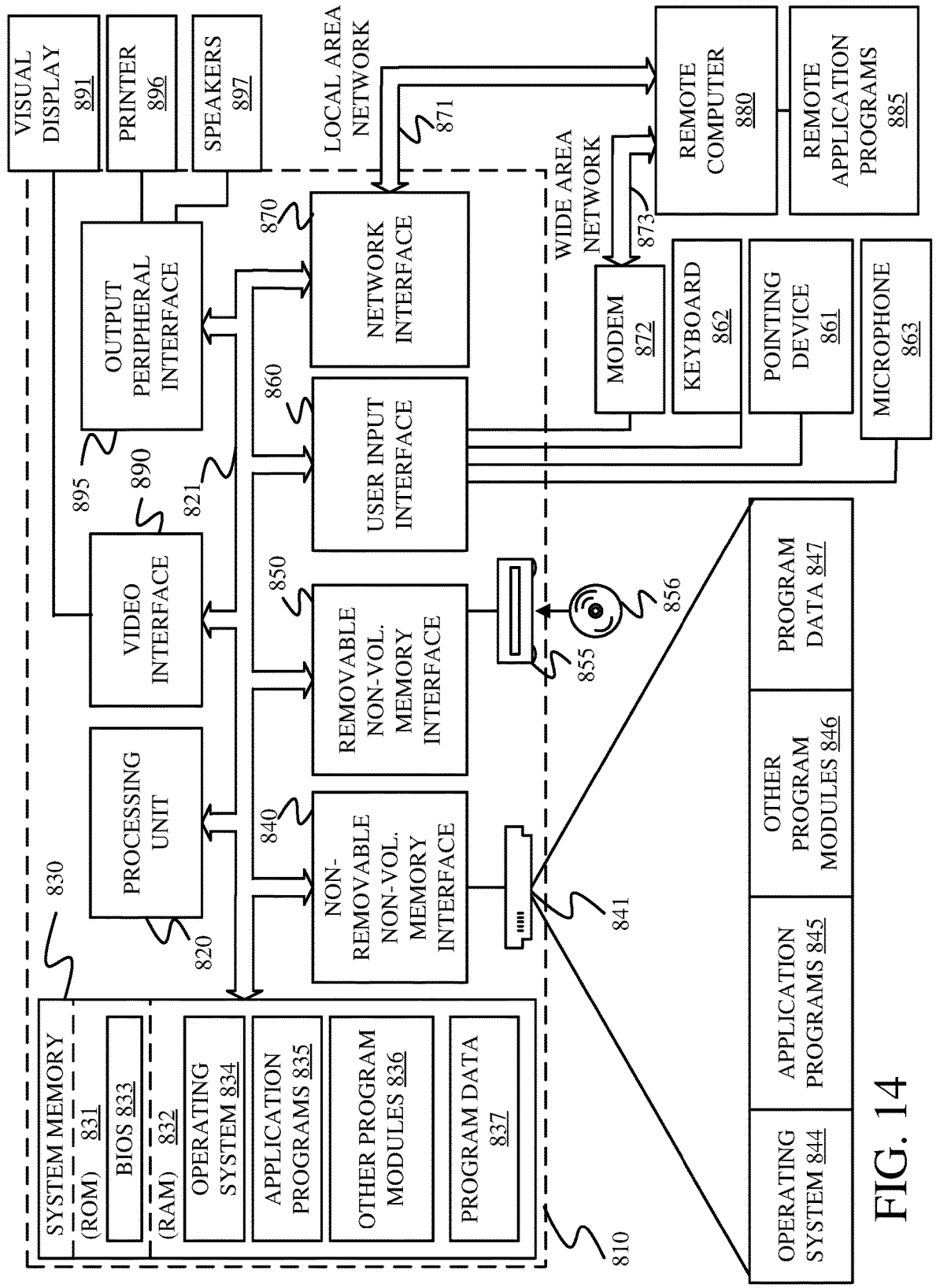
FIG. 14 is a block diagram showing one example of a computing environment that can be used in the architectures shown in the previous Figures.

FIG. 14 is one example of a computing environment in which elements of FIGS. 1 and 8, or parts of it, (for example) can be deployed. With reference to FIG. 14, an example system for implementing some embodiments includes a computing device in the form of a computer 810 programmed to operate as described above. Components of computer 810 may include, but are not limited to, a processing unit 820 (which can comprise processors from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 1 and 8 can be deployed in corresponding portions of FIG. 14.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 14 illustrates operating system 834, application programs 835, other program modules 836, and program data 837.

The computer 810 may also include other removable/non-removable volatile/nonvolatile computer storage media. By way of example only, FIG. 14 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 810. In FIG. 14, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 14 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural system, comprising:
   a first material application system configured to apply a first material;
   a reference position identifier configured to identify a reference position on an agricultural surface corresponding to the first material;
   a second material application system configured to apply a second material based on the identified reference position, the second material of a different type than the first material;
   a material sensor configured to sense a characteristic of the second material and generate a material sensor signal indicative of the characteristic;
   a sensor signal processing system configured to identify a location of the second material based on the material sensor signal, identify a relationship between the location of the second material and the identified reference position, and generate a processing system output signal based on the identified relationship between the location of the second material and the identified reference position;
   an action identification system configured to identify an action based on the processing system output signal; and
   a control signal generation system configured to generate a control signal to perform the identified action.

2. The agricultural system of claim 1 wherein the second material application system comprises an actuator that is actuated to apply the second material and wherein the material sensor comprises:
   a pressure sensor configured to sense a pressure of the second material applied by a valve and generate, as the material sensor signal, a pressure sensor signal indicative of the pressure of the second material and indicative of application of the second material.

3. The agricultural system of claim 1 wherein the second material application system comprises an actuator that is actuated to apply the second material and wherein the material sensor comprises:
   a flow sensor configured to sense flow of the second material through the second material application system and generate, as the material sensor signal, a flow sensor signal indicative of the flow of the second material.

4. The agricultural system of claim 1 wherein the material sensor comprises:
   an optical sensor configured to sense, as the characteristic of the second material, an optical characteristic of the second material applied by the second material application system and generate, as the material sensor signal, an optical sensor signal indicative of the optical characteristic of the second material.

5. The agricultural system of claim 4 wherein the optical sensor is configured to detect a material additive in the second material.

6. The agricultural system of claim 4 wherein the optical sensor comprises:
   a beam break sensor that has a radiation emitter configured to emit electromagnetic radiation and a radiation detector configured to detect electromagnetic radiation and is configured to sense, as the characteristic of the second material, that the second material breaks a radiation beam emitted by the radiation emitter and generate, as the material sensor signal, a beam break sensor signal indicative of the second material breaking the radiation beam.

7. The agricultural system of claim 4 wherein the optical sensor comprises:
   a light curtain sensor that has a light curtain radiation emitter configured to emit a light curtain of electromagnetic radiation and a radiation detector configured to detect electromagnetic radiation and is configured to sense, as the characteristic of the second material, that the second material breaks the light curtain of electromagnetic radiation and generate, as the material sensor signal, a light curtain break sensor signal indicative of the second material breaking the light curtain of electromagnetic radiation.

8. The agricultural system of claim 4 wherein the optical sensor comprises:
an image sensor configured to sense, as the characteristic of the second material, an image of the agricultural surface where the second material is applied by the second material application system and generate, as the material sensor signal, an image signal indicative of the image of the agricultural surface.

9. The agricultural system of claim 1 wherein the material sensor comprises:
a temperature sensor configured to sense, as the characteristic of the second material, a temperature characteristic of the second material applied by the second material application system and generate, as the material sensor signal, a temperature sensor signal indicative of the temperature characteristic of the second material.

10. The agricultural system of claim 9 wherein the temperature sensor comprises an infrared (IR) sensor.

11. The agricultural system of claim 1 wherein the material sensor comprises:
an electrical property sensor configured to sense, as the characteristic of the second material, an electrical property of the second material applied by the second material application system and generate, as the material sensor signal, an electrical property sensor signal indicative of the electrical property of the second material.

12. The agricultural system of claim 11 wherein the electrical property sensor comprises:
an electrical conductivity sensor configured to sense, as the characteristic of the second material, an electrical conductivity of the second material applied by the second material application system and generate, as the material sensor signal, an electrical conductivity sensor signal indicative of the electrical conductivity of the second material.

13. The agricultural system of claim 11 wherein the electrical property sensor comprises:
an electrical capacitance sensor configured to sense, as the characteristic of the second material, an electrical capacitance of the second material applied by the second material application system and generate, as the material sensor signal, an electrical capacitance sensor signal indicative of the electrical capacitance of the second material.

14. The agricultural system of claim 1 wherein the material sensor comprises:
a spectroscopy sensor configured to sense, as the characteristic of the second material, a spectroscopic property of the second material applied by the second material application system and generate, as the material sensor signal, a spectroscopic property sensor signal indicative of the spectroscopic property of the second material.

15. The agricultural system of claim 1 wherein the first material application system comprises a seed application system configured to apply seed as the first material, the seed application system comprising a seed delivery system and a seed metering system wherein the reference position identifier comprises:
a seed sensor configured to sense a seed in one of the seed delivery system or the seed metering system and generate a seed sensor signal indicative of the sensed seed; and
a seed location identifier configured to identify, as the reference position, a seed location of the seed on the agricultural surface based on the seed sensor signal.

16. An agricultural planting machine, comprising:
a seed application system configured to apply seed;
a reference position identifier configured to identify a reference position on an agricultural surface corresponding to the seed;
a material application system configured to apply material based on the identified reference position, the material different than the seed;
a material sensor configured to sense a characteristic of the material and generate a material sensor signal indicative of the characteristic;
a sensor signal processing system configured to identify a location of the applied material based on the material sensor signal, identify a relationship between the location of the applied material and the identified reference position, and generate processing system output signal based on the identified relationship between the location of the applied material and the identified reference position;
an action identification system configured to identify an action based on the processing system output signal; and
a control signal generation system configured to generate a control signal to perform the identified action.

17. The agricultural planting machine of claim 16 wherein the material sensor comprises:
an optical sensor configured to sense, as the characteristic of the material, an optical characteristic of the material applied by the material application system and generate, as the material sensor signal, an optical sensor signal indicative of the optical characteristic of the material.

18. The agricultural planting machine of claim 16 wherein the material sensor comprises:
a temperature sensor configured to sense, as the characteristic of the material, a temperature characteristic of the material applied by the material application system and generate, as the material sensor signal, a temperature sensor signal indicative of the temperature characteristic of the material.

19. The agricultural planting machine of claim 16 wherein the material sensor comprises:
an electrical property sensor configured to sense, as the characteristic of the material, an electrical property of the material applied by the material application system and generate, as the material sensor signal, an electrical property sensor signal indicative of the electrical property of the material.

20. The agricultural planting machine of claim 16 wherein the material sensor is configured to sense the characteristic of the material after the material is applied to the agricultural surface.

21. A method of controlling an agricultural system, comprising:
applying first material to an agricultural surface;
identifying a reference position on the agricultural surface corresponding to the first material;

applying second material to the agricultural surface based on the identified reference position, the second material of a different type than the first material;

sensing a characteristic of the second material;

generating a material sensor signal indicative of the characteristic;

identifying a location of the second material based on the material sensor signal;

identifying a relationship between the location of the second material and the identified reference position;

generating a processing system output signal based on the identified relationship between the location of the second material and the identified reference position;

identifying an action based on the processing system output signal; and generating a control signal to perform the identified action.

* * * * *